US010048688B2

(12) United States Patent
Ramasamy

(10) Patent No.: US 10,048,688 B2
(45) Date of Patent: Aug. 14, 2018

(54) DYNAMIC LANE DEFINITION

(71) Applicant: QUALCOMM Incorporated, San Diego, CA (US)

(72) Inventor: Bala Ramasamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/192,926

(22) Filed: Jun. 24, 2016

(65) Prior Publication Data
US 2017/0371337 A1 Dec. 28, 2017

(51) Int. Cl.
*G05D 1/00* (2006.01)
*G08G 1/0967* (2006.01)
*G08G 1/0968* (2006.01)
*B60W 30/12* (2006.01)
*B60W 40/06* (2012.01)
*G01C 21/32* (2006.01)
*G08G 1/015* (2006.01)
*G08G 1/056* (2006.01)

(52) U.S. Cl.
CPC ........... *G05D 1/0088* (2013.01); *B60W 30/12* (2013.01); *B60W 40/06* (2013.01); *G01C 21/32* (2013.01); *G08G 1/015* (2013.01); *G08G 1/056* (2013.01); *G08G 1/096716* (2013.01); *G08G 1/096725* (2013.01); *G08G 1/096741* (2013.01); *G08G 1/096775* (2013.01)

(58) Field of Classification Search
CPC ................................................... G05D 1/0088
See application file for complete search history.

(56) References Cited

U.S. PATENT DOCUMENTS

| 5,621,645 | A | 4/1997 | Brady |
| 6,094,616 | A | 7/2000 | Andreas et al. |
| 6,205,381 | B1 * | 3/2001 | Motz .................... A01B 69/008 340/988 |
| 7,979,173 | B2 | 7/2011 | Breed |
| 9,180,908 | B2 | 11/2015 | Van Dan Elzen et al. |
| 9,355,562 | B1 | 5/2016 | Ferguson |
| 9,400,187 | B2 * | 7/2016 | Lee ..................... G01C 21/3605 |
| 9,547,986 | B1 * | 1/2017 | Curlander ................ G08G 1/09 |

(Continued)

FOREIGN PATENT DOCUMENTS

| DE | 102012023498 A1 | 6/2014 |
| EP | 2075170 A1 | 7/2009 |

(Continued)

OTHER PUBLICATIONS

Li Q., et al., "A Sensor-Fusion Drivable-Region and Lane-Detection System for Autonomous Vehicle Navigation in Challenging Road Scenarios," IEEE Transactions on Vehicular Technology, Feb. 2014, vol. 63 (2), pp. 540-555.

(Continued)

*Primary Examiner* — Todd M Melton
(74) *Attorney, Agent, or Firm* — Kilpatrick Townsend & Stockton, LLP

(57) ABSTRACT

Methods, systems, computer-readable media, and apparatuses for automated dynamic lane definition are presented. One example method includes the steps of accessing vehicle information for a vehicle travelling on the road; accessing road information for a road; and defining at least one lane for the road based on the road information and the vehicle information.

29 Claims, 13 Drawing Sheets

(56) References Cited

U.S. PATENT DOCUMENTS

| | | |
|---|---|---|
| 2003/0060969 A1 | 3/2003 | Waite et al. |
| 2006/0020389 A1 | 1/2006 | Yamamoto |
| 2009/0018761 A1 | 1/2009 | Petrisor |
| 2014/0118182 A1 | 5/2014 | Oh et al. |
| 2016/0036917 A1 | 2/2016 | Koravadi et al. |
| 2016/0180707 A1 | 6/2016 | MacNeille et al. |

FOREIGN PATENT DOCUMENTS

| | | |
|---|---|---|
| JP | 2006236247 A | 9/2006 |
| JP | 2015018447 A | 1/2015 |

OTHER PUBLICATIONS

International Search Report and Written Opinion—PCT/US2017/031143—ISA/EPO—dated Aug. 30, 2017.

\* cited by examiner

DYNAMIC LANE DEFINITION

BACKGROUND

Driving lanes on roads are typically established with visual markers, such as solid or dashed lines or reflectors. Further, lanes in the United States are typically between 10-15 feet wide. However, average vehicle width is between 5-6 feet including side view mirrors (this includes trucks & SUVs), while average semi-truck width is limited to 8.5 feet in US. Thus, lanes tend to be much wider than may be needed by the traffic operating on the roadway, and may result in inefficient use of the road surface. Also, while vehicles are currently available that can provide lane assistance based on visual markers, e.g., lane dividers, many parts of the world do not provide such visual markers. Thus, vehicles travelling along the road have no defined lanes in which they may travel. While this may be addressed by the driver in a manually-driven vehicle, an autonomous vehicle may not operate well or at all in such an environment.

BRIEF SUMMARY

Various examples are described for dynamic lane definition. For example, one disclosed method includes accessing vehicle information for a vehicle travelling on the road; accessing road information for a road; and defining at least one lane for the road based on the road information and the vehicle information.

In another example, a disclosed system includes a non-transitory computer-readable medium; and a processor in communication with the non-transitory computer-readable medium, the processor configured to execute program code stored in the non-transitory computer-readable medium, the program code comprising program code configured to cause the processor to: access road information for a road; access vehicle information for a vehicle travelling on the road; and define at least one lane for the road based on the road information and the vehicle information.

Another example system includes means for accessing road information for a road; means for accessing vehicle information for a vehicle travelling on the road; and means for defining at least one lane for the road based on the road information and the vehicle information.

One example non-transitory computer readable medium comprises executable instructions configured to cause a processor to: access road information for a road; access vehicle information for a vehicle travelling on the road; and define at least one lane for the road based on the road information and the vehicle information.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
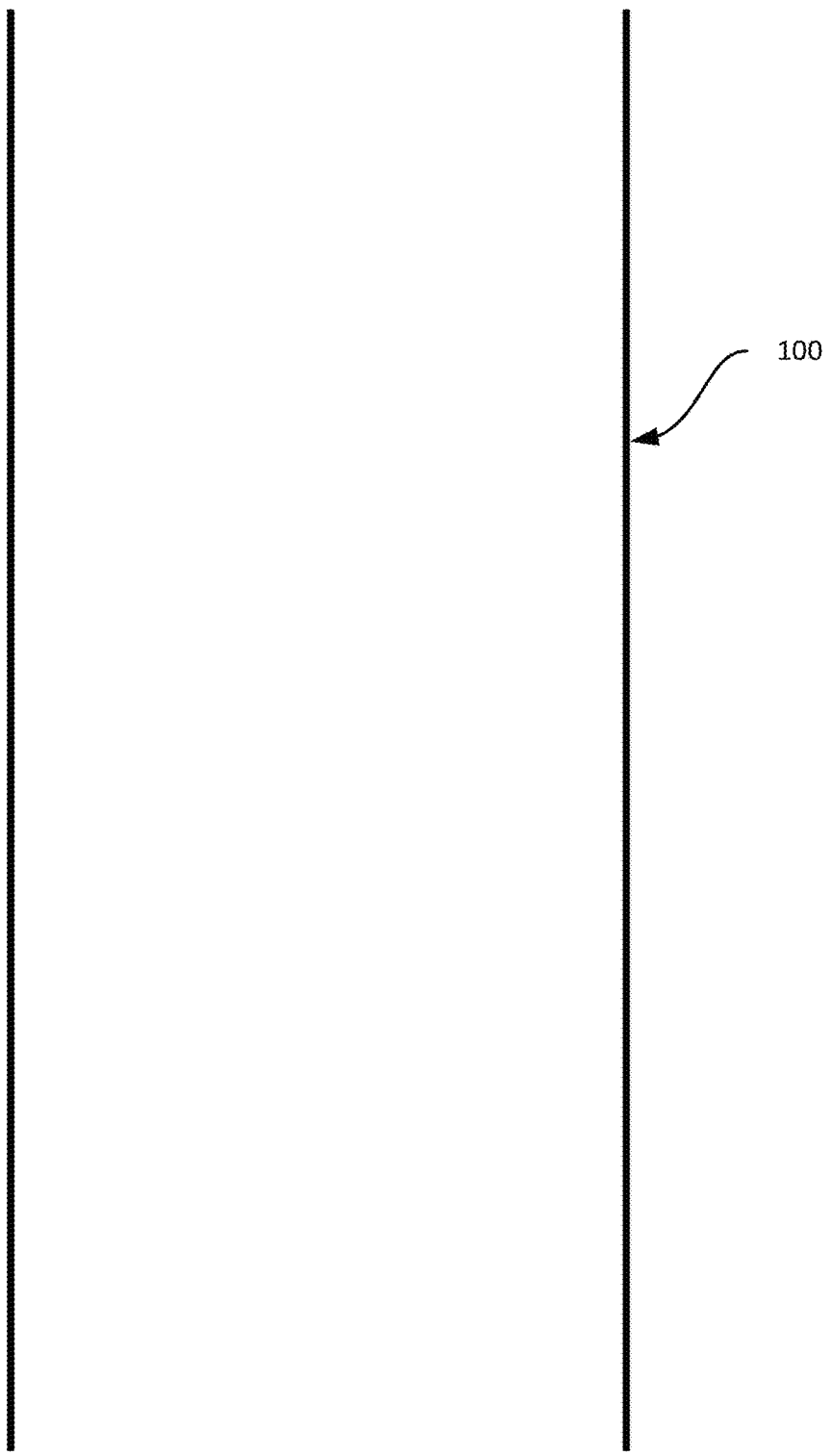
FIGS. 1-4 show example dynamic lanes on a road.

Examples are described herein in the context of dynamic lane definition. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of Dynamic Lane Definition

In this illustrative example, a driver's autonomous car navigates onto a road that lacks lane markings. The vehicle initially uses sensors to search for visual lane markings, such as lines painted on the road, or ferromagnetic material embedded within the road surface. After failing to sense such lane information, the vehicle transmits a request for lane information to a lane management system and provides a vehicle identifier, a location, a direction of travel. The lane management system receives the request and determines whether one or more lanes have been defined for the road. The lane management system does not detect any defined lanes on the road, and so based on the vehicle identifier, it determines an approximate width of the requesting vehicle. In addition, the lane management system accesses information about the road, such as the width of the road. The system then generates a lane of travel suitable for use by the requesting vehicle while in an autonomous driving mode.

In this example, the lane definition server determines that the vehicle is 74 inches wide, and that the road is 65 feet from edge to edge. Thus, the lane definition server defines a first lane for the road having a width of 122 inches, by providing 24 inches of clearance on either side of the requesting vehicle, and establishes the lane at the right edge of the road (from the perspective of the requesting vehicle), but offset from the edge of the road by 12 inches. It further defines the lane to extend for a distance of 250 feet in front of the requesting vehicle and for a distance of 20 feet behind the requesting vehicle.

After defining the lane of travel, it transmits a message to the requesting vehicle with the dimension and placement of the lane on the road. The car receives the lane definition from the lane management system and, using its autonomous driving functionality, repositions itself on the driving surface within the center of the newly-defined lane. In addition, the car provides a visual representation of the lane on a heads-up display such that the driver is able to see the defined lane despite a lack of lane markings on the road. Thus, in the event the driver changes from an autonomous driving mode to a manual driving mode, the driver is provided with visual indications of the lane and may maintain the vehicle within the boundaries of the lane.

As other cars enter the road, they may also request lanes of travel from the lane management system. If one or more of the other cars are within close proximity to the original car, the lane management system may extend the lane to be used by the new car(s). However, if the cars are not within close proximity, the lane management system may generate new lanes for such cars. Alternatively, a car entering the road may detect the original car nearby and communicate with it to obtain lane information from it. The original car may then provide the lane information to the newly-arrived car, which may then use the lane and report to the lane management system its use of the previously-defined lane.

As the cars travel down the road, they may approach, or be approached by other vehicles. When such an event occurs, the cars, or the lane management system, may merge the lane for the approaching vehicles into a single lane, or one or more additional lanes of travel may be generated, such as to allow the approaching vehicle(s) to pass.

This illustrative example is not intended to be in any way limiting, but instead is intended to provide an introduction to the subject matter of the present application. For example, the illustrative example above is described with respect to an autonomous car; however, the present application is not limited to such an environment, but may be used in any suitable environment. Other examples of dynamic lane definition are described below.

Figure 5:
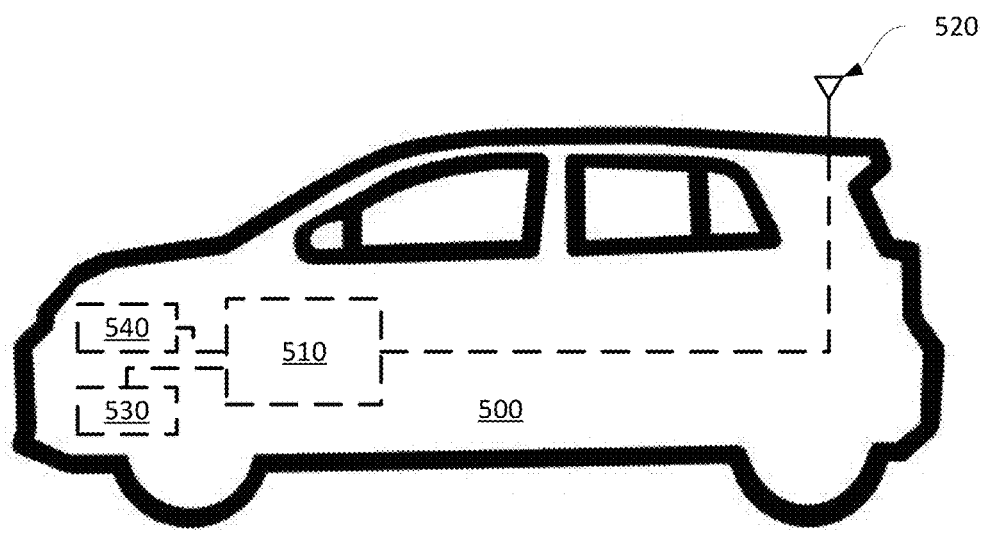
FIGS. 5-7 show example devices and systems for dynamic lane definition.

Referring now to FIG. 5, FIG. 5 shows an example system for dynamic lane definition. In the example shown in FIG. 5, a vehicle 500 has been equipped with a computing device 510 in communication with an antenna 520 and one or more sensors 530, 540. The computing device 510 is configured to receive radio signals from the antenna 520, and in some examples, may be configured to transmit radio signals using the antenna 520. For example, the computing device 510 may be configured to transmit signals that may be employed by other suitable computing devices or a lane management system according to different examples for dynamic lane definition. Such signals may include information such as a driving mode of the vehicle 500, an identifier for the vehicle 500 or computing device 510, one or more dimensions of the vehicle 500, one or more dimensions of a lane of travel of the vehicle 500, a speed of the vehicle 500, a heading of the vehicle 500, or other information. It should be noted that the locations of the computing device 510 and the antenna 520 shown in FIG. 5 are merely examples, and in other examples, any suitable location within the vehicle 500 or other vehicle may be used.

Figure 7:
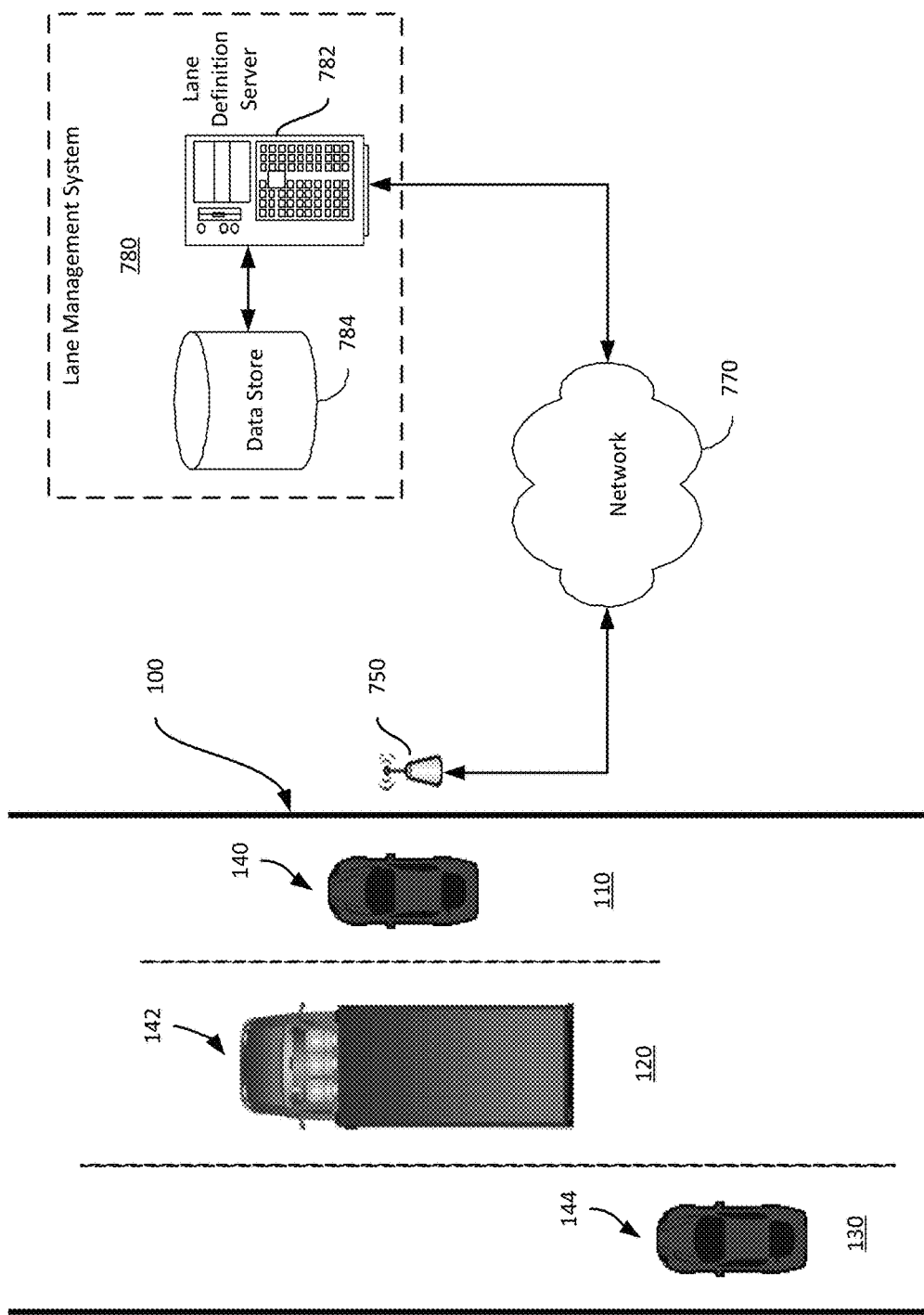

It should also be noted that while the network-based examples illustrated in FIG. 7 and discussed throughout reference a lane management system and a lane definition server for ease of explanation, it is understood that vehicle-based implementations are also possible such that a lane management system and a lane management server may be implemented within the vehicle. Furthermore, it is understood that the method illustrated in FIG. 8A may be executed by the computing device 510 in the vehicle 500. Hence, in some implementations, computing device 510 in the vehicle 500 can be configured to access vehicle information for vehicle 500, access road information for a road, and dynamically define at least one lane for the road based on the road information and the vehicle information. For example, computing device 510 may access processor-executable program code stored on a non-transitory computer-readable medium, the program code configured to cause a processor to access vehicle information for vehicle 500, access road information for a road, and dynamically define at least one lane for the road based on the road information and the vehicle information.

As shown in FIG. 5, the vehicle 500 may be equipped with one or more sensors 530, 540 of the same or different types. For example, sensors 530 may comprise optical sensors, e.g., LIDAR, or electromagnetic sensors, e.g., RADAR. One or more such sensors may be configured to detect physical lane markers, such as indicators (e.g., stripes) painted on the road surface, or material embedded within the road surface, such as ferromagnetic materials, which may provide information to the computing device 510 that may be used to maintain a lane of travel, e.g., based on detections of lane boundaries, or change lanes. In some examples, sensors 540 may comprise proximity sensors configured to detect other vehicles. Example sensors may include image sensors, ultrasound range sensors, laser range sensors, radar, or other suitable proximity sensors. One or more sensors 530, 540 may be affixed to the vehicle, such as on the front, sides, and rear of the vehicle. In some examples, one or more omnidirectional sensor(s) 530, 540 may be affixed to the roof of the vehicle.

The computing device 510 may further function as, or being communication with, a navigation system of the vehicle 500. The computing device 510 may be configured in some examples to access navigation information, such as preprogrammed route information or location information that may be employed for dynamic lane definition.

Figure 6:
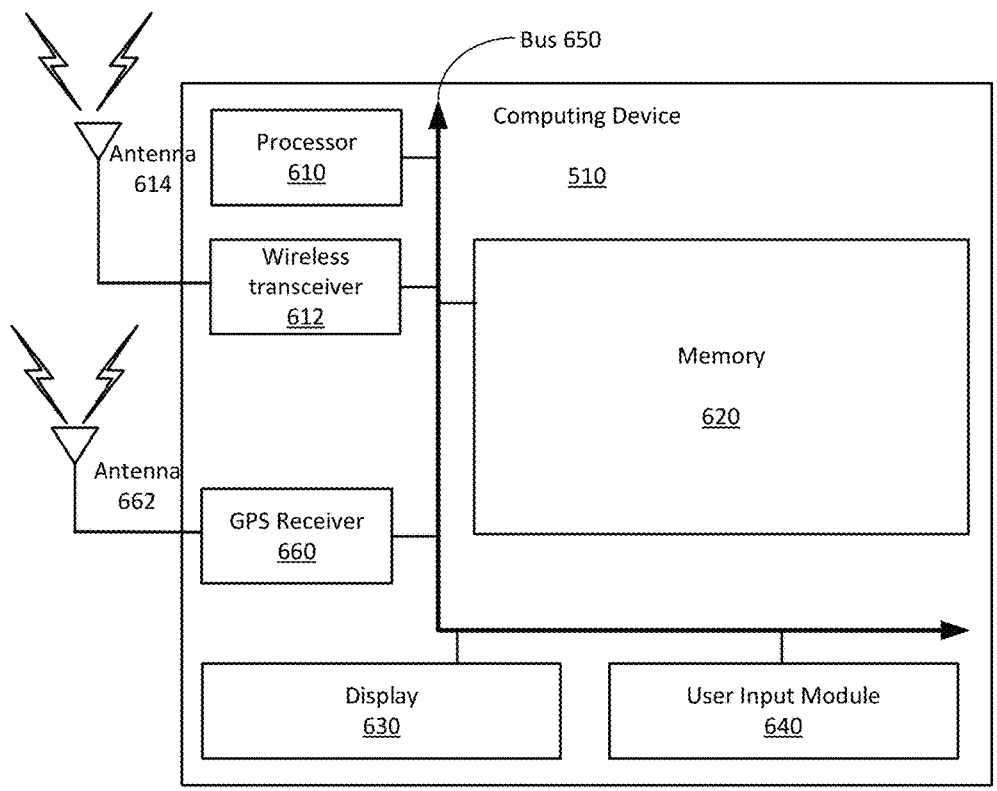

FIG. 6 shows a more detailed view of the example computing device 510 shown in FIG. 5. In the example shown in FIG. 6, the computing device 510 includes a processor 610, a memory 620, a wireless transceiver 612, a Global Navigation Satellite System ("GNSS") receiver 660, e.g., Global Positioning System ("GPS") and antenna 662, a display 630, a user input module 640, and a bus 650. In this example, the computing device 510 comprises a vehicle-based navigation system, but may be any suitable device, include an embedded computing device, a cellular phone, a laptop computer, a tablet, a phablet, a personal digital assistant (PDA), wearable device, or augmented reality device. The processor 610 is configured to employ bus 650 to execute program code stored in memory 620, to output display signals to a display 630, and to receive input from the user input module 640. For example, the display 630 may comprise a heads-up display configured to provide visual indications of one or more lanes defined according to this disclosure. In addition, the processor 610 is configured to receive information from the GNSS receiver 660 and wireless transceiver 612 and to transmit information to the wireless transceiver 612.

The wireless transceiver 612 is configured to transmit and receive wireless signals via antenna 614. For example, the wireless transceiver 612 may be configured to receive radio signals from a wireless AP or other suitable wireless signal transmitter. In some examples, the computing device 510 may comprise one or more additional wireless transceivers and associated antennas that may be configured to communicate with a cellular base station by transmitting signals to and receiving signals from an antenna associated with the cellular base station. The GNSS receiver 660 is configured to receive signals from one or more GNSS satellites and to provide location signals to the processor 610. It should be noted that all of the components shown in the computing device 510 are not required in various examples. For example, the GNSS receiver 660 and antenna 662 may be optional as may be the display 630, and user input module 640.

In this example, the computing device 510 is configured to dynamically define one or more lanes of travel for a road, or to receive one or more dynamically-defined lanes of travel for a road. For example, the processor 610 in conjunction with program code to cause the processor to execute the example method of FIGS. 8A-8B discussed in more detail below, the computing device provides means for accessing road information for a road, means for accessing vehicle information for a vehicle travelling on the road, and means for defining at least one lane for the road based on the road information and the vehicle information. Further, in some examples, the computing device 510 may also include means for determining a number of lanes for the road, means for defining a plurality of lanes for the road based on the number of lanes for the road, or means for defining widths for each of the defined plurality of lanes.

Referring now to FIG. 7, FIG. 7 shows an example lane management system 780 in communication with a plurality of vehicles 140-144 via a network 770 in communication with a wireless communication node 750. The lane management system 780 includes at least one lane definition server 782 and at least one data store 784. The lane management system 780 may be configured to perform one or more methods according to this disclosure.

In the system shown in FIG. 7, suitable computing devices disposed within vehicles 140-144 are in communication with the lane management system 780 via the wireless communication node 750, which may be a cellular antenna, wireless AP, or other wireless transceiver device. The wireless communication node 750 is configured to communicate with one or more of the vehicles 140-144, such as to provide a broadcast or point-to-point signal usable by one or more of the vehicles 140-144 for dynamic lane definition, and to receive signals from one or more of the vehicles 140-144 to provide information to the lane management system 780, or to receive information from the lane management system 780. For example, a vehicle may provide a lane dynamically defined by the vehicle, or it may request a lane for use on the road 100.

In some examples, a lane management system 780 may comprise a plurality of lane definition servers 782 or data stores 784. For example, a lane management system 780 for a metropolitan area may comprise a large number of servers capable of managing a large number of roads and vehicles. Further, different lane management systems 780 may manage different types of roads, e.g., highways, city streets, residential neighborhoods, etc., or may have overlapping geographic responsibility. In some such examples, suitable lane management systems, such as the example shown in FIG. 7, may be configured to handoff vehicles that transition from a road or area managed by one system to a road or area managed by another system. Thus, the lane management system 780 may be integrated into a network of lane management systems in some examples.

In this example, the lane management system 780 maintains information about vehicles travelling on roads under the management of the lane definition server 782. For purposes of this example, the lane definition server 782 is configured to manage the road 100 shown in FIG. 7, however, it may also be configured to manage other roads as discussed above. The data store 784 maintains records associated with vehicles travelling on the road 100 managed by the lane management system 780. In this example, the vehicle information comprise information associated with dimensions of respective vehicles. For example, vehicle information may comprise a year, make, and model of a vehicle, which may be used to access length, width, and height information for the vehicle. Other suitable information may include actual dimensions of a vehicle received from the vehicle, such as length, width, or height measurements, weight of the vehicle, number of wheels (e.g., motorcycle, car, tractor trailer, etc.), or a vehicle identifier that can be used to access vehicle-specific information. For example, a vehicle identifier may comprise a vehicle identifier corresponding to a particular year, make, and model of the vehicle, or it may comprise a previously-assigned vehicle identifier that is associated with vehicle information previously stored in the data store 484, such as length, width, or height information. In some examples, a vehicle record may comprise a vehicle type, such as sedan, hatchback, SUV, pickup truck, hybrid or electric vehicle, high-efficiency vehicle, emergency vehicle (e.g., police car, fire engine, ambulance, etc.), tractor-trailer, motorcycle, or other vehicle type, or it may include information such as a mode of operation, such as manual mode, semi-autonomous, autonomous, emergency, patrol, etc. Such information may be used to access average or typical dimensions for such vehicle types. For example, a sedan vehicle type may be associated with an average length of 17 feet and an average width of 6.25 feet.

In some examples, other vehicle information may be stored by the data store 784. For example, vehicle information may include a vehicle driving mode, a location, a direction of travel, an associated road, or a lane of travel. Vehicle information maintained by the data store 784 may comprise other or additional information, such as a vehicle condition (e.g., normal, mechanical problem, student driver, number of passengers, etc.), destination information, route information, or time information (e.g., time at which the information was received or last updated). The lane definition server 782 may access vehicle information in the data store 784 to define a lane on a road for a vehicle.

In addition to vehicle information, the data store 784 also maintains road information associated with roads managed by the lane management system 780, such as the road 100 in FIG. 7. In some examples, road information includes a name of a road, information about the physical layout of a road surface, (e.g., a width of the road surface), a condition of the road surface (e.g., pot holes, debris, obstruction, water, or ice), shoulders or medians and associated information (e.g., width or length of such features), one or more intersection(s) with other road(s), road entry and exit points and associated information (e.g., a width and length of the entry and exit point), infrastructure information (e.g., light poles, signs, traffic lights and types of traffic lights, or drains), terrain information (e.g., embankments or road camber angles), or other information. Such information may affect one or more dynamically-defined lanes created, managed, or eliminated by the lane management system 780.

The data store 784 may also store lane information associated with one or more roads. For example, the lane definition server 782 may dynamically-define one or more lanes for a road and store such information in the data store 784, or maintain such lane information within a memory of the lane definition server 782. In some examples, the data store 784 may comprise a large amount of lane information for a road. For example, a lane management system may manage a portion of an interstate highway extending for fifty miles. Over such a distance, the highway may have a large number of dynamically-defined lanes having different lengths and widths, different speed limits, construction zones, etc.

Lane information may include information defining one or more lanes of travel on a road. Such information may include a width of a lane, a length of a lane, a center-point of the lane with respect to the road surface, a buffer area size for a lane, a shape of a lane, a duration of a lane, or other information. A width of a lane indicates the distance between a left edge of a lane and a right edge of a lane on a road surface. The width may be based on a width of one or more vehicles and one or more buffer areas. Buffer areas are used to define a lane that is wider than the width of vehicles within the lane. It may not be desirable in some examples to define a lane that is exactly the width of a vehicle (or vehicles) travelling in the lane. Thus, the lane may be defined to be wider than the vehicle(s) by adding a buffer area on each side of the lane, assuming that the vehicle is positioned in the center of the lane. For example, if a 24 inch buffer area is defined, and a vehicle is 6 feet wide, a defined lane will be 10 feet wide, by adding a 24-inch buffer on either side of the vehicle. Such buffer areas may allow the vehicle to "wander" within the boundaries of the lane, e.g., due to imprecisions in an autonomous driving system or inattentiveness of a driver, or it may allow for vehicles of slightly varying widths to share the same lane without encroaching onto an adjacent lane. Buffer areas may be of differing sizes, and may be determined based on the type(s) of vehicle(s) expected to use the lane, a driving mode of such vehicle(s), an expected speed of such vehicle(s), or other factors. For example, the lane definition server 782 may employ 36 inch buffer areas when defining lanes to accommodate vehicles operated in a manual driving mode, or for large vehicles, such as semis or other heavy equipment.

Lane information may comprise a length in some examples because a lane may not stretch the entire length of a road, but may only accommodate a single car or a group of cars, or may be defined for a specific localized purpose, such as a turn lane or a median. A center-point of a lane relates to positioning of the lane on a road surface. In addition to defining a lane, the lane definition server 782 may also specify a position for the lane on the road surface, such as to allow for multiple adjacent lanes. Thus, in one example, the lane definition server 782 may define a position on the road surface at which the center of the lane is positioned. Such a position may be specified with respect to one or both edges of the road surface, may be specified with respect to another defined lane, or may be specified with respect to a vehicle or vehicles.

In some examples, a lane may have invariant boundaries. For example, a lane may be defined that has a fixed width and length. However, in some examples, a lane's shape may vary. For example, a lane's width may have a small, localized variance, which may allow the lane to avoid a pothole or other road debris. In some examples, a lane's width may change to accommodate a wider vehicle entering or exiting the lane or to accommodate a narrowing or widening of the road surface, such as immediately prior to or after a tunnel or bridge.

Further, a lane may be defined with a specific duration, which may be absolute or relative. For example, one or more lanes may be defined to accommodate statistical traffic flow over a road at different times of day. During certain hours in the morning, a road may be entirely dedicated to a direction of travel towards a downtown area to accommodate a morning rush hour. Some or all of the lanes defined during that period may have a predetermined start and end time, such as 7-9 am. At 9 am, half of the lanes may expire and be replaced by lanes travelling in the opposite direction, or by unallocated road surface, or the existing lanes may be modified to change their respective directions of travel. At 4 pm, the inbound lanes may expire and be replaced by lanes for traffic heading out of a downtown area to accommodate the end-of-day rush hour, or the existing lanes may be modified accordingly. At 6 pm, half of those lanes may then expire, and be replaced by lanes or unallocated road surface that again allow two directions of traffic.

In some examples, a lane may be defined based on a request from a vehicle and may begin at the point where the vehicle requested the lane and may extend and "travel with" the vehicle. The portions of the lanes traversed by the vehicle may immediately expire, which may allow other lanes to be defined for other vehicles at a later time. However, in some examples, the portions of the lanes traversed by the vehicle may persist for a period of time to allow other vehicles to make use of them, which may also reduce the processing requirements on the lane definition server 782. After some period of idleness, unused portions of the lane may expire to allow for other lanes to be defined. Still other lane characteristics may be defined in examples according to this disclosure.

In some implementations, dynamically defining at least one lane for a road based on road information and vehicle information includes defining the at least one lane for the road at a given point in time based on appropriate road information and vehicle information relevant at the given point in time and subsequently defining the at least one lane for the road differently at a subsequent point in time. Examples of road and vehicle information are provided above. However, additional considerations may be used as well, such as time of day, day of the week (e.g., weekday versus weekend), season, scheduled special events (e.g., a concert or sporting event), etc. Such a dynamic definition may be performed by the lane management system 780 or by a vehicle traveling on a road, as will be discussed in greater detail below.

In this example, the lane definition server 782 is configured to dynamically define one or more lanes of travel for a road, or to receive one or more dynamically-defined lanes of travel for a road. For example, the lane definition server 782 in conjunction with program code to execute the example methods of FIGS. 8A-8B discussed in more detail below, the lane definition server 782 provides means for accessing road information for a road, means for accessing vehicle information for a vehicle travelling on the road, and means for defining at least one lane for the road based on the road information and the vehicle information. Further, in some examples, the lane definition server 782 may also include means for determining a number of lanes for the road, means for defining a plurality of lanes for the road based on the number of lanes for the road, or means for defining widths for each of the defined plurality of lanes.

The following illustrates one example method for dynamic lane definition performed by a lane management system 780, as well as another example method for dynamic lane definition performed by a vehicle travelling on a road.

Figure 8A:
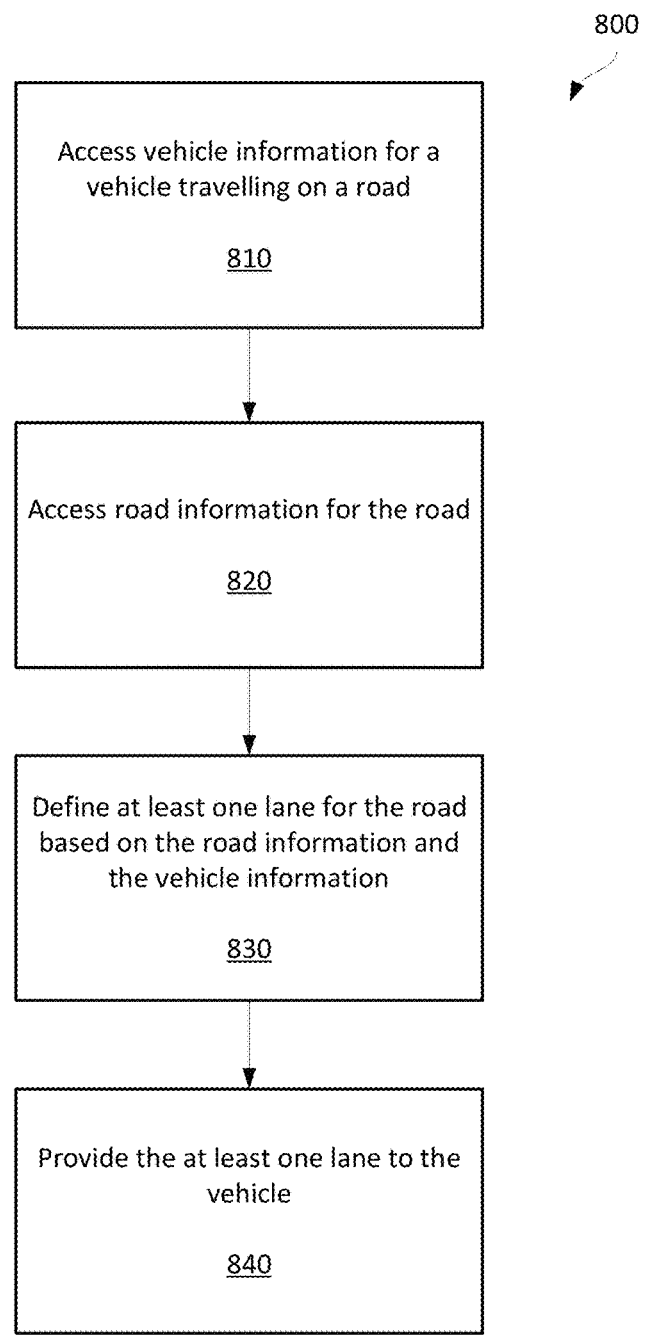
FIGS. 8A-8B show example methods for dynamic lane definition.

Referring now to FIG. 8A, FIG. 8A shows an example method 800 for dynamic lane definition. Reference will be made to the lane management system 780 of FIG. 7, however, any suitable example system according to this disclosure may be employed.

At block 810, the lane definition server 782 accesses vehicle information for a vehicle travelling on a road. As discussed above, the lane definition server 782 accesses vehicle information from the data store 784, such as based on a particular segment of the road, or based on a request received from a vehicle. For example, the lane definition server 782 receives a request for a dynamically-defined lane from a vehicle travelling on the road 100. In this example, the request includes vehicle dimension information, including indicating physical dimensions of the requesting vehicle; a location; and a direction of travel. For purposes of this example, the request indicates that the requesting vehicle is 17 feet long and 6.25 feet wide; however, other requests may comprise other vehicle dimension information, such as that discussed above with respect to FIG. 7.

In response to the request, the lane definition server 782 accesses the data store 784 to access information about the road 100 or previously-defined lanes on the road 100, or about other vehicles traveling on the road 100 within a threshold range of the requesting vehicle. For example, the lane definition server 782 requests vehicle records from the data store 784 for vehicles operating in the same direction of travel within 500 feet of the requesting vehicle.

In some examples, to access vehicle information, the lane management system 780 may transmit a message to vehicles travelling on the road 100 and request responses from vehicles within 500 feet of a particular location, such as the location extracted from the requesting vehicle's lane management request, a location of an accident or other emergency, a location of an emergency vehicle (either in transit, or stationary), a location of a construction zone, or others. In this example, the request includes a request for vehicle dimension information; a vehicle year, make, and model; a vehicle identifier; or other information that may be used to determine a size of a responding vehicle. In response to the request, the lane management system 780 may then receive vehicle information from vehicles within the area specified in the request.

While the above example describes a response to a request received from a vehicle, in some examples, the lane management system 780 may access vehicle information independently of any request from a vehicle. For example, the lane management system 780 may access vehicle information associated with a particular location to dynamically define or modify lanes based on traffic patterns, accidents, road hazards, or other road information.

For example, the lane management system 780 may receive a notification of an accident on a road. The lane definition server 782 may then request and obtain information regarding a portion of the road obstructed by the accident. Such information may be used to determine a change in the size of a road at the location of the road, such as by temporarily reducing the width of the road at locations corresponding to the accident. Based on the reduced road width, the lane definition server 782 may merge or eliminate one or more defined lanes on the road. Alternatively, rather than eliminating a lane of travel, the lane definition server may mark one or more lanes as prohibited lanes of travel while the accident is addressed by emergency or other personnel.

In addition to the vehicle information, the lane definition server 782 may also access road information before, concurrently with, or after accessing vehicle information.

At block 820, the lane definition server 782 accesses road information for the road 100. In this example, the lane definition server 782 accesses information for the road associated with the request received from the vehicle. The request included a location and a direction of travel, thus the lane definition server 782 accesses road information based on the location. For example, referring again to FIG. 1, the accessed road information indicates that the surface of the road 100 is 60 feet wide and is unobstructed at the location and within 500 feet from the location in the identified direction of travel for the requesting vehicle. In this example, the lane definition server 782 determines whether any lanes for the road 100 have been defined at the location provided by the requesting vehicle or within 500 feet of the requesting vehicle. If so, the lane definition server 782 also accesses lane information associated with the previously-defined lanes.

In some examples, a road surface may allow for multiple lanes of travel, which may allow for multiple directions of travel. For example, road 100 is determined to be 60 feet wide, which may accommodate multiple lanes of travel. In one example, the lane management system 780 is configured to dynamically define vehicle lanes on the road 100, but depending on one or more factors, the entire road surface may be used for a single direction of travel or for multiple directions of travel. Further, over time, the road configuration may change to allow for a single direction of travel at certain times, while at other times multiple directions of travel may be allowed. Some example lane management systems may dynamically define directions of travel for a road surface, either in conjunction with defining one or more dynamic vehicle lanes, or independently of such dynamic vehicle lanes. Thus, road information may also include a current configuration including configured directions of travel, or other dynamically-defined characteristics of a road, e.g., prohibited areas, vehicle driving mode requirements or limitations, occupancy requirements or limitations, or other characteristics.

At block 830, the lane management system 780 defines at least one lane for the road based on the vehicle information and the road information. In this example, the lane definition server 782 defines a lane for the road 100 to accommodate the requesting vehicle. As mentioned above, for purposes of this example, the requesting vehicle is 17 feet long and 6.25 feet wide. In addition, the lane definition server 782 determines the vehicle's driving mode, e.g., an autonomous driving mode or a manual driving mode. If such information was not initially provided by the requesting vehicle, the lane definition server 782 may transmit a request for such information to the vehicle. In this example, the requesting vehicle response to the request indicating that it is operating in an autonomous driving mode.

Referring to FIG. 1, FIG. 1 shows road 100, for which the requesting vehicle requests a dynamically-defined lane. As mentioned above, the example road 100 is 60 feet wide and has no obstructions at the vehicle's location or within 500 feet of the location in the requesting vehicle's indicated direction of travel. Further, based on the accessed road information, the lane definition server 782 determines that the entire road surface is configured for a single direction of travel, which is the same direction of travel as the requesting vehicle, that no other lanes have been defined for the road 100 at the location identified by the requesting vehicle, and that no other vehicles are located within 500 feet of the location identified by the requesting vehicle. Based on the accessed vehicle information and road information, the lane definition server 782 defines a lane for the requesting vehicle.

In this example, the lane management system 782 defines a lane based on the width and driving mode of the requesting vehicle. In an autonomous driving mode, a vehicle may be more capable of maintaining a lane position than a vehicle operating in a manual driving mode, thus, a lane width may be narrower for autonomously-operated vehicles than for manually-operated vehicles. Thus, in this example, the lane definition server 782 determines a lane width by adding a small buffer area or 24 inches to the width of the car, one on either side of the vehicle. Thus, the defined lane width in this example is 10.25 feet. In some examples, the lane definition server 782 may be configured to use different buffer area sizes based on the vehicle information or the road information as discussed above.

Figure 2:
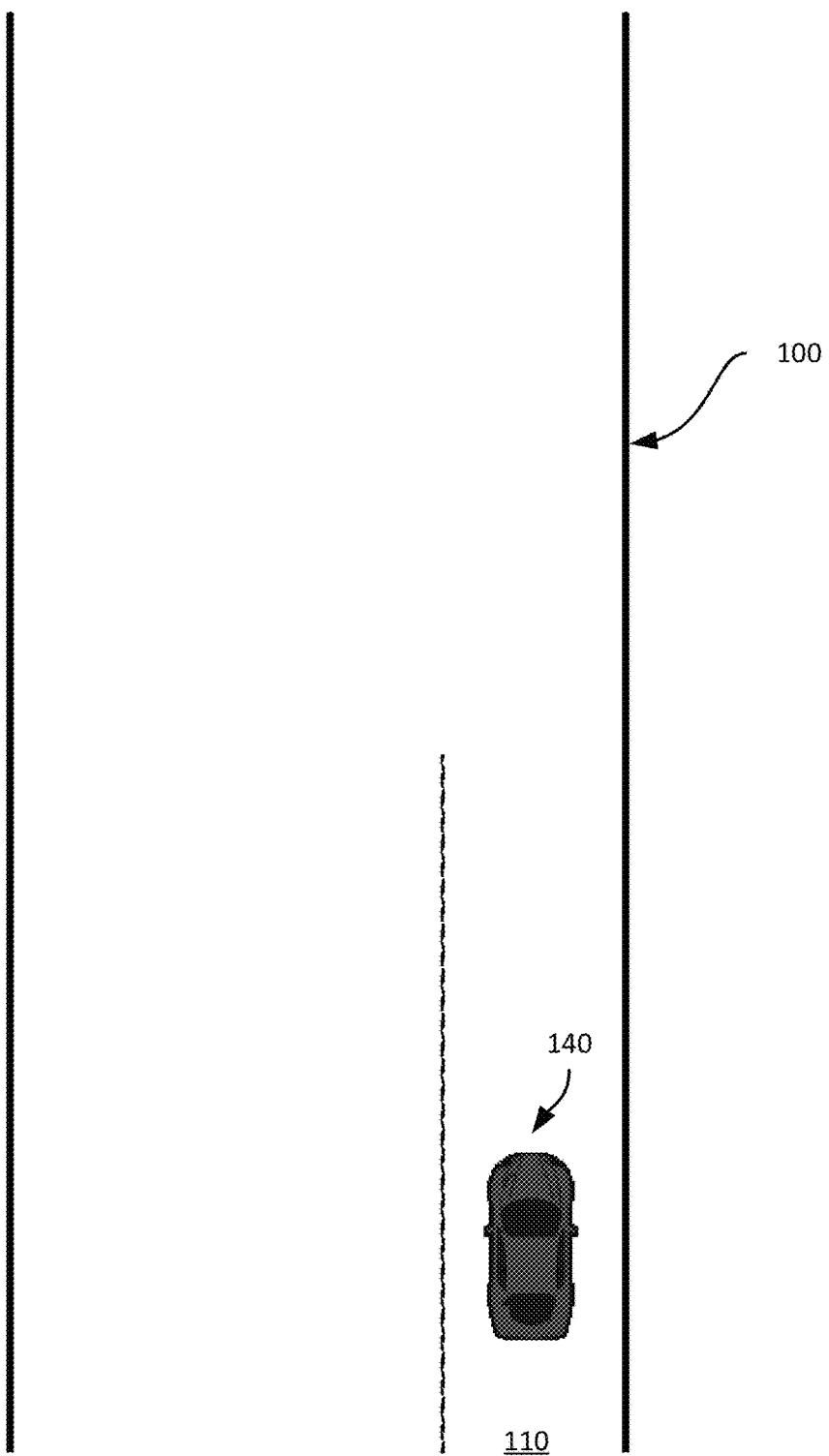

The lane definition server 782 also determines a lane length. In this example, the lane definition server 782 defines a lane specifically for use by the requesting vehicle. For example, referring to FIG. 2, vehicle 140 is the only vehicle travelling on a particular section of the road 100. Thus, while the lane definition server 782 could generate a lane spanning a significant distance, e.g., one mile, it instead determines that, based on the minimal amount of traffic, the new lane begins approximately 20 feet behind the rear edge of the vehicle 140 and extends for a distance of approximately 250 feet beyond the front edge of the vehicle 140. Such a lane may be defined to allow a vehicle to travel along a largely empty road relatively easily. Further, as the vehicle 140 travels, the lane travels with the vehicle 140. Thus, the lane is defined to continue to extend 250 feet beyond the front edge of the vehicle 140 as it travels, thus generating a lane that apparently travels with the vehicle 140.

However, in some examples, the lane definition server 782 may instead define a lane that extends for a specific distance, as discussed above. For example, the lane definition server 782 may instead define a lane that extends for a distance of five miles. Such a determination may be made based on predetermined route or destination information provided to the lane management system 780 by the vehicle 140. For example, the lane may be defined to extend five miles because the vehicle is scheduled to exit the road 100 in five miles to take a different road, or such a lane may be generated to connect existing separate lanes into a single lane. Alternatively, the lane definition server 782 may define a length for the lane, e.g., one mile, such that the vehicle re-requests a lane of travel upon nearing the end of the defined lane, which may allow the lane definition server 782 to redefine the lane with updated information relating to other vehicles on the road 100, e.g., to merge the vehicle 140 into a different previously-defined lane.

As discussed above, the lane definition server 782 may obtain information regarding one or more road conditions. For example, referring to FIG. 9A, the lane definition server 782 accessed road information for the road 100 and determined that a pothole 102 has been indicated at a location on the road 100. Further, the previously-defined lane 110 for the vehicle 140 travelling on the road 100 partially overlaps with the pothole 102. Thus, the lane definition server 782 determines whether the shape of the lane can be adjusted to eliminate the overlap with the pothole 102. In this example, the road information indicates that lane 110 overlaps with the pothole 102 by 18 inches. Thus, lane definition server 782 then calculates the maximum lane width at the location of the pothole to be 8.75 feet, which would temporarily result in a buffer area of 1.375 feet on each side of the vehicle 140. The lane definition server 782 then determines a minimum buffer area threshold. In this example, the lane definition server 782 maintains multiple minimum buffer area thresholds, one for short distances (e.g., between 0 and 100 feet), one for intermediate distances (e.g., between 100 and 500 feet), and one for long distances (e.g., greater than 500 feet). Based on the size of the pothole, which in this example is approximately 3 feet in diameter, the lane definition server determines that reducing the lane width to eliminate overlap with the pothole satisfies the short distance threshold, and so the lane definition server 782 defines the lane to have a shape that narrows to 8.75 feet at the pothole, and returns to the previously-determined width of 10.25 feet beyond the pothole. Referring to FIG. 9B, the redefined lane 110 is shown, which has a portion shaped to avoid overlapping the pothole, referred to as a lane pocket 112.

Figure 3:
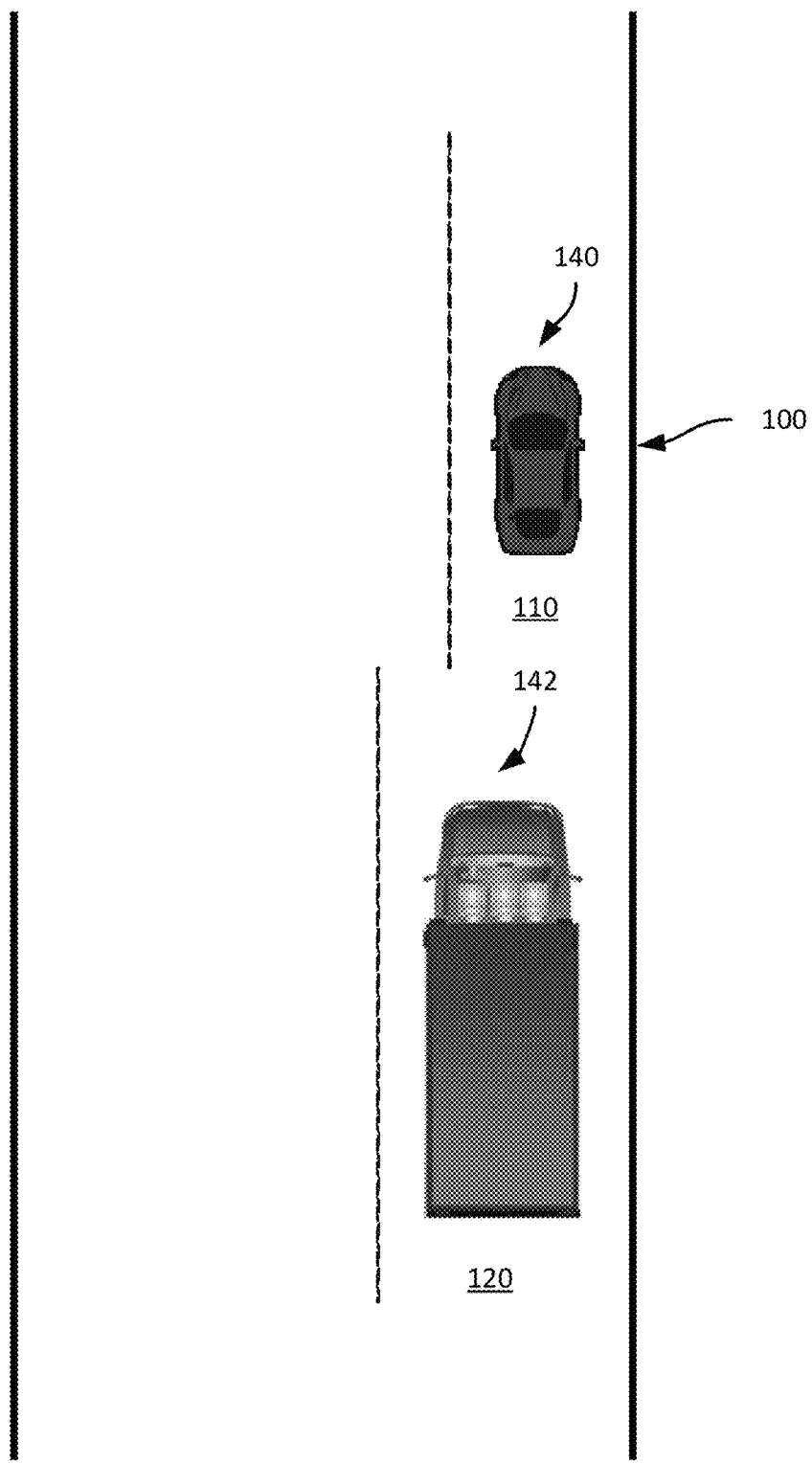

In some examples, as discussed above, the lane management system 780 may define a lane to have a duration. For example, the lane management system 780 may define a lane that travels with a vehicle 140. Referring to FIG. 3, FIG. 3 shows the road 100 on which the vehicle 140 continues to operate within its defined lane 110. In this example, the lane defined by the lane management system 780 is configured to extend approximately 250 feet in front of the vehicle and 20 feet behind the vehicle. Thus, portions of the lane more than 20 feet behind the vehicle 140 expire, leaving the road surface without a defined lane. Thus, as the vehicle 140 travels down the road 100, the lane travels with the vehicle 140 such that the lane continues to extend 250 beyond the vehicle 140. In some examples, a lane may have a duration based on other factors than the presence of a vehicle. For example, a lane may persist based on a time of day. As discussed above, one or more lanes may be defined to exist during rush hours or for special events. In some examples, a lane may be defined to exist for a period of time after a vehicle passes through a location. For example, a lane management system may define a lane for a vehicle and allow the lane to persist for an additional five minutes to allow for any other similar vehicles travelling along the road to make use of the lane without re-defining a new lane. Still other examples of lanes with limited duration are contemplated by this disclosure.

Referring to FIG. 3, FIG. 3 shows a truck 142 that has entered the road 100 as well. The truck has requested a lane from the lane management system 120, which has defined a new lane 120 for the truck. In this example, the lane definition server 782 determined that the width of the truck, which for this example is eight feet, is too wide for the lane 110 defined for the vehicle 140. However, due to the light traffic on the road 100, the lane definition server 782 has defined the new lane 120 to also be located on the right edge of the road 100 and positioned to the rear of the vehicle 140. Like the previously-existing lane 110, the new lane 120 is defined to extend a short distance in front of and behind the truck 142, and to travel with the truck 142. In this example, the lane management system 780 has defined the new lane 120 to extend forward from the truck 120 for 250 feet or until it overlaps with another lane, such as the previously-existing lane 110. As can be seen in FIG. 3, the new lane 120 extends to the rear edge of the other previously-existing lane 110. In this example, the lane definition server 782 may determine that lanes 110 and 120 should be merged to define a new lane configured to accommodate both the vehicle 140 and the truck 142. However, the truck driver instead decides to pass the vehicle 140.

The truck driver presses his turn signal and begins to move towards the left edge of the new lane 120. In response, the truck's computing device detects the turn signal and receives sensor signals from the truck's sensors indicating that it is moving towards the left edge of the lane. The computing device, then transmits a request to the lane management system 780 for a new lane to overtake the vehicle 140. The lane definition server 782 receives the request, accesses the vehicle information from the request or from the data store 784 and accesses the road information.

In this example, the lane definition server 782 determines whether a new lane can be defined adjacent to the vehicle's lane 110. As can be seen, the space on the road adjacent to the vehicle's lane 110 is empty. However, not shown in FIG. 3 is another vehicle travelling in a lane defined on the left edge of the road. Thus, the lane definition server 782 determines whether a new lane can be defined between the vehicle's lane 110 on the right of the road and the lane on the left of the road. However, based on the width of the road and the width of the two vehicle lanes, the lane definition server 782 determines that a new lane can be defined. Thus, the lane definition server 782 defines a new lane and eliminates the prior, previously defined lane 120 occupied by the truck.

Referring now to FIG. 4, FIG. 4 again shows the road 100 and now shows the newly-defined lane 122 for the truck, and the approaching vehicle 144 in a lane 130 defined on the left edge of the road 100. As can be seen the lane management system 780 has defined a suitable lane 122 for the truck that sits between the two vehicle lanes 110, 130 and allows the truck 122 to pass the vehicle 140 in the right lane 110, while not interfering with the vehicle in the left lane.

Figure 10:
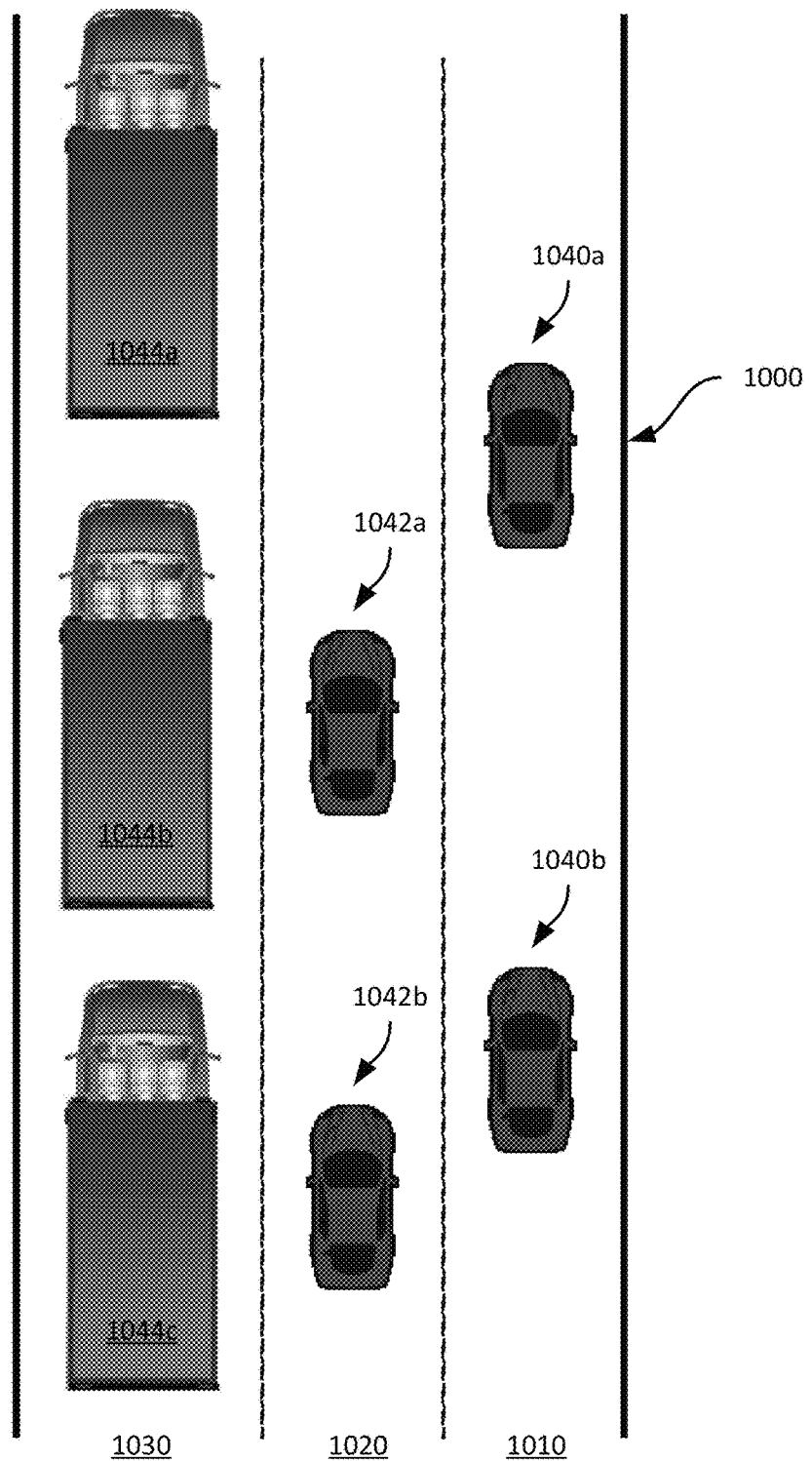

Referring now to FIG. 10, FIG. 10 shows an example road 1000 with three lanes 1010-1030 defined by a suitable lane management system, such as the lane management system 780 shown in FIG. 7. In this example, traffic on the road 1000 is heavy and the lane management system 782 has defined one lane 1030 size for use by semis 1044a-c and two lanes 1010, 1020 sized for passenger cars 1040a-b, 1042a-b. In this example, the lane management system 782 has established extended travel lanes accommodating multiple vehicles, in contrast to the vehicle lanes shown in FIGS. 1-4, which were defined for individual vehicles.

As can be seen, the different lanes 1010-130 have been defined to have different widths based on the different vehicles. In this example, however, entry and exit onto the road is accomplished on the right edge of the road. Further, the right and middle lanes 1010, 1020 are not sized to accommodate a truck. Thus, a truck travelling in the left lane 1030 attempting to exit the road 1000 will traverse lanes that are smaller than allowed. Lane management system 782 is configured to allow a truck to travel across the other lanes 1010-1020 by creating a portable individual lane and assigning it to the truck.

In this example, truck 1044b determines that it needs to exit the road 1000, and makes a request to traverse lanes 1020 and 1010. The truck's computing device transmits a request to the lane management system 780 to define a lane to allow the truck 1044b to exit the road. The lane management system 780 receives the request and, in response, accesses vehicle and road information. In this example, it accesses information about the lanes 1010-1030, the various vehicles travelling on the road in proximity to the truck 1044b, and determines a portable lane suitable for the truck 1044b. The lane definition server 782 then defines a lane centered on the center of the truck having a buffer area of 24 inches on either side of the truck and that extends 60 feet in front of the truck and 20 feet behind the truck. The truck receives a notification from the lane definition server 782 that a new lane has been defined for the truck 1044b and begins to merge right into lane 1020, once vehicle 1042a has safely passed the truck 1044b. In addition, the lane management system 782 transmits a message to vehicles in proximity to the truck to notify them of the portable lane.

Figure 11:
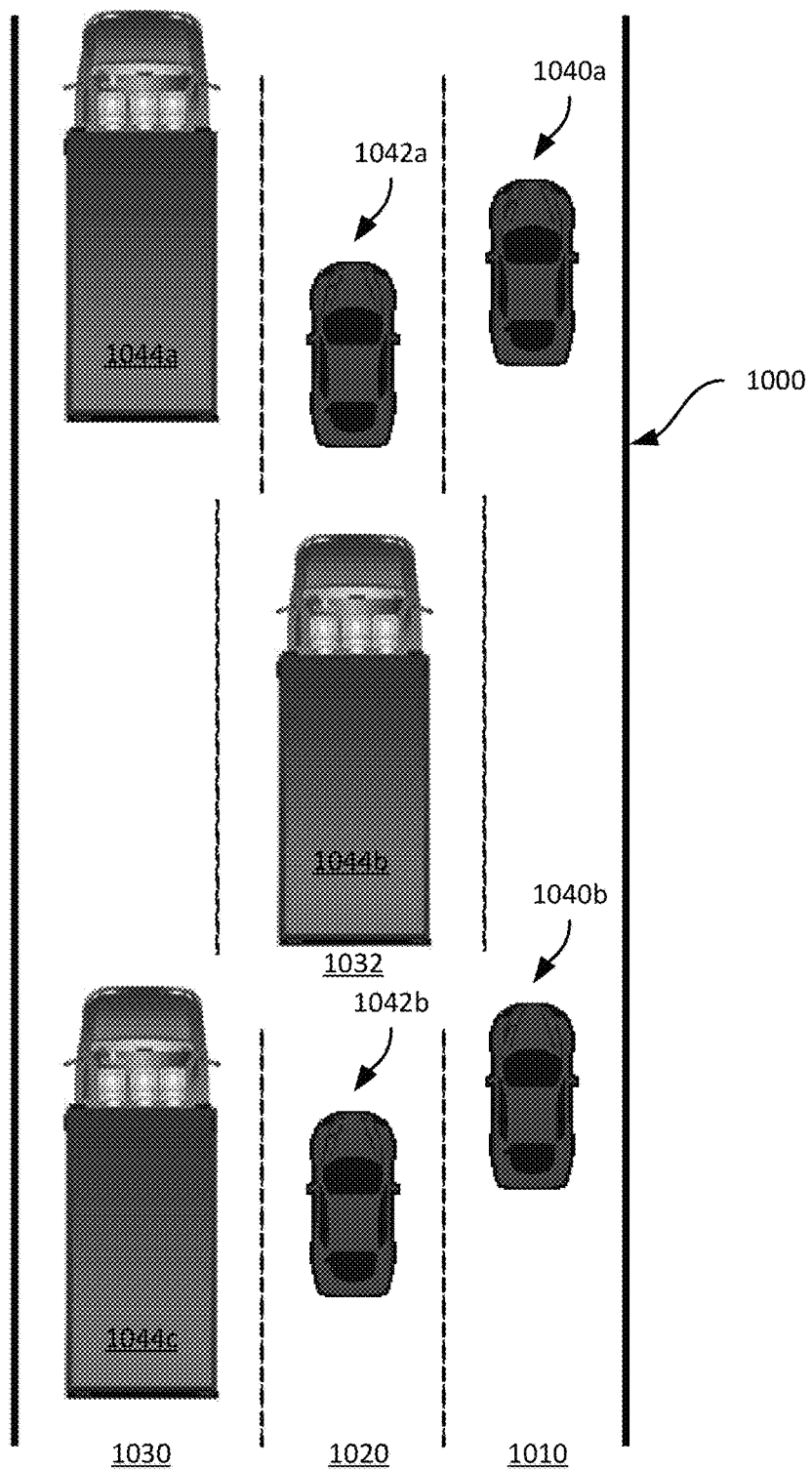
Figure 12:
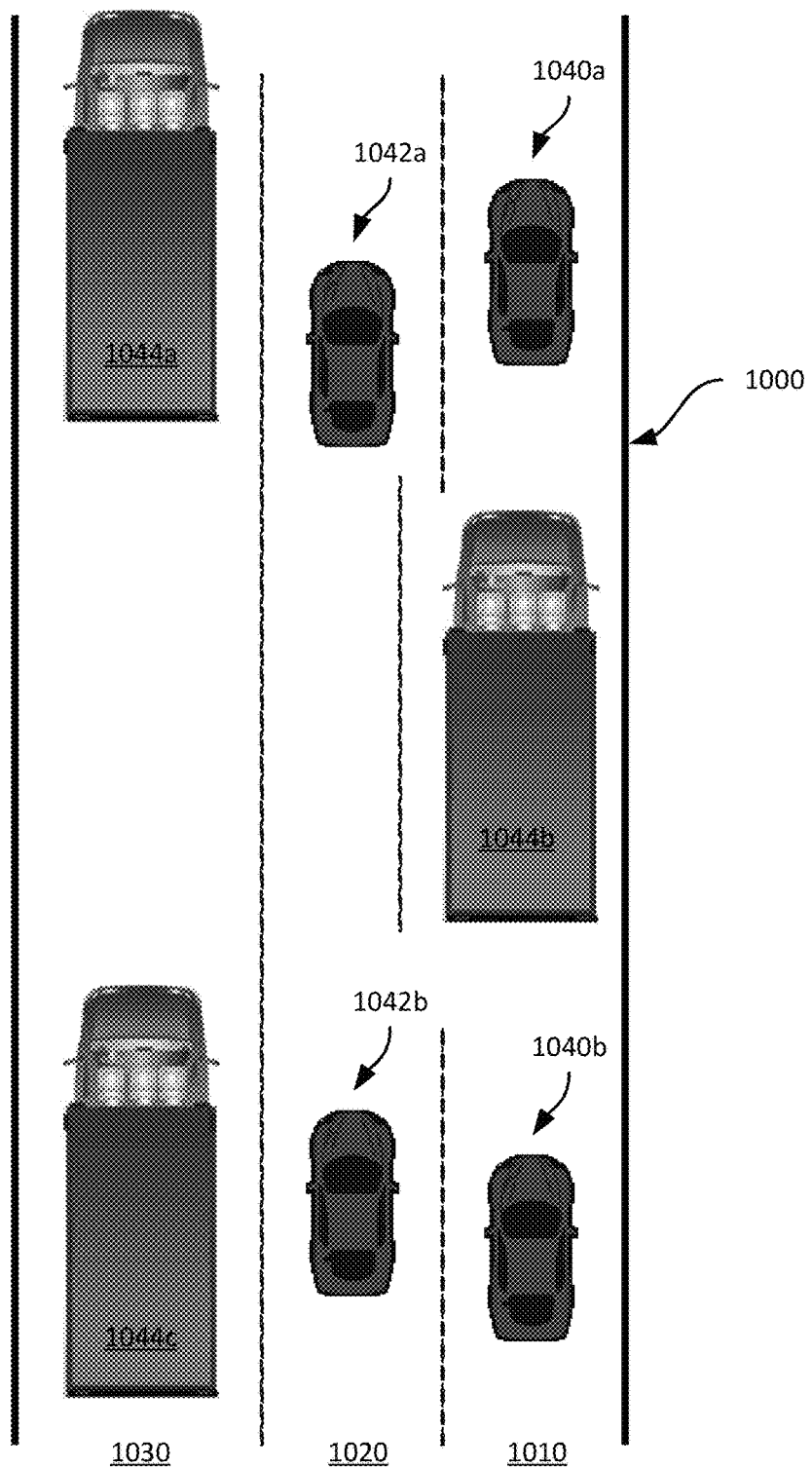

Referring now to FIG. 11, the truck has merged right and its portable lane, width is defined based on the center of the truck rather than the road surface, has moved with the truck as it moves into the middle lane 1020. In some examples, the truck's computing device 1044 may communicate with the other vehicles 1042a-b in the middle lane 1020, though in others it may not. In this example, the truck 1044b does not communicate with the other vehicles, but instead relies on the vehicle's drivers or autonomous driving systems to detect the trucks presence in the lane. The truck 1044b moves into the middle lane 1020, then into the right lane 1010 as shown in FIG. 12, and then exits the road 1000, and throughout the truck's movement, the portable lane remains centered on the truck 142 and so moves with the truck 142.

It should be noted that while the lane definition above is based on the center of the truck, in some examples, a lane may be dynamically defined based on a location of a GNSS receiver or other wireless transceiver on the vehicle. For example, a GNSS receiver may not be placed on the exact centerline of a vehicle, but instead, may be placed on one side or the other, or nearer to the front or rear of the vehicle. Thus, position information obtained from a GNSS receiver, or position information received from another wireless transceiver (e.g., a WiFi transceiver), may be offset from a true center of the vehicle. Thus, vehicle information may include a relative location, or an offset, of the GNSS or other wireless transceiver on the vehicle from the center of the vehicle.

At block 840, the lane management system 780 provides the at least one lane to the vehicle. In this example, the lane definition server 782 transmits the defined lane to the requesting vehicle by transmitting it to the wireless communication node 750 via the network 770. The wireless communication node 750 then transmits the defined lane to the computing device in the requesting vehicle.

The discussion of the method 800 of FIG. 8A above was made with reference to a lane management system 780. However, in some examples, such a lane management system 780 may not be available or may not be configured to define vehicle lanes in a particular area, or the vehicle's computing device 510 itself may be configured as a lane management system to define lanes for the vehicle or other vehicles. In some examples, a vehicle may be configured to define its own lane of travel independently of, or in conjunction with, a lane management system. Thus, in some examples, individual vehicles may access vehicle and road information to define a lane of travel on a road, and in some examples, provide the defined lane to other vehicles.

Referring again to FIG. 8A, in this example, the discussion of the method 800 of FIG. 8A will be made with reference to the computing device 510 of FIGS. 5 and 6. However, any suitable computing device according to this disclosure may be employed.

At block 810, the computing device 510 of a first vehicle accesses its own vehicle information and determines its operating mode and other characteristics of the first vehicle. For example, the computing device 510 determines that the first vehicle 140 is 17 feet long and 6.25 feet wide and is travelling in an autonomous driving mode. In this example, the vehicle employs one or more sensors 540 to determine vehicles within a threshold range of the first vehicle, e.g., 200 feet. In some examples, the computing device 510 may be configured to transmit a signal configured to be received by suitable computing devices affixed to other vehicles, and requesting responses from vehicles within the threshold range of the first vehicle and travelling in the same direction as the first vehicle. In some examples, the computing device 510 may transmit directly to other vehicles using a peer-to-peer communication mode, such as a vehicle-to-vehicle ("VTV") communication mode, or may transmit to other vehicles via a communication network, such as a cellular network, or using a vehicle-to-vehicle-via-LTE ("VTX") communication mode. The computing device 510 may then receive responses from vehicles that satisfy the request. Such responses may comprise information associated with the responding vehicle, such as a vehicle dimension information, driving mode, a current lane, a current speed, a route, a destination, or other information.

In one example, the computing device 510 may receive unsolicited vehicle information from another vehicle or from a lane management system 780. For example, an emergency vehicle travelling on the road may directly transmit, or broadcast, a message indicating a lane of travel for the emergency vehicle and a vehicle status or vehicle type of "Emergency."

In addition to accessing the vehicle information for the first vehicle and any vehicle information received from other vehicles, the computing device 510 may also access road information before, concurrently with, or after accessing vehicle information.

At block 820, the computing device 510 of the first vehicle accesses road information for a road. In this example, the computing device 510 accesses road information from a navigation system of the first vehicle. For example, the navigation system may have, or have access to, map information associated with a plurality of roads, either stored within the navigation system, e.g., on a computer-readable medium, or accessible via a network connection to a map service or a crowdsourcing service, such as via the Internet. In this example, to access the road information, the computing device 510 transmits a request for road information to the navigation system, which, based on a location of the first vehicle, provides road information for the road on which the first vehicle is travelling. In some examples, however, the computing device 510 may directly access the road information, such as by accessing a computer-readable medium having such road information stored on it, or by accessing a map service or a crowdsourcing service, such as via the Internet. Different types of road information have been discussed above, and are equally applicable in this example or other examples according to this disclosure.

At block 830, the computing device 510 of the first vehicle 140 defines a lane for the road based on the road information and the vehicle information. Referring again to the road 100 of FIG. 1, the first vehicle 140 prepares to enter the road 100 and transmits a message with its location to other vehicles requesting a response from other vehicles within a threshold range of the first vehicle's location, e.g., within 500 feet of the first vehicle's location. In an example where no other vehicles respond, and no other vehicles are detected based on sensor information received from the sensors 530, 540, the first vehicle 140 defines a lane for itself on the road 100. In this example, the first vehicle 140 defines a lane for itself on the right side of the road 100. The first vehicle 140 defines the lane based on the vehicle information it accessed, including the width of the vehicle and a predefined buffer area. In this example, the first vehicle 140 employs a buffer area of two feet for a lane width of 10.25 feet. The first vehicle 140 then uses the road information to determine where on the road 100 to locate the lane. In this example, the first vehicle 140 assigns the lane to abut the right edge of the road 100. Referring again to FIG. 2, the first vehicle 140 centers the lane at a location one half of the lane width from the right edge of the road. In addition, because the first vehicle 140 is defining a lane for itself, it defines the lane to only extend for 200 feet to the front of the first vehicle 140 and to travel with the first vehicle 140, as discussed above. Thus, the first vehicle 140 defines the lane 110 shown in FIG. 2. In some examples, the first vehicle 140 may transmit the defined lane to a lane management system. While the lane management system may manage the road 100, when the road is lightly traveled, the lane management system may allow individual vehicles to manage the process of lane definition, or may define lanes for vehicles lacking the ability to define their own lanes.

Referring now to FIG. 3, a truck 142 has entered the road while operating in an autonomous driving mode. The truck's computing device transmits a message with the truck's location to other vehicles, requesting a response from vehicles within proximity of the truck 142. In this example, the first vehicle 140 receives the truck's message, and transmits a response to the truck 142 that provides the information about the first vehicle 140 and about the lane 110 defined by the first vehicle 140. For example, the message may provide vehicle dimension information for the first vehicle 140, and the dimensions and locations of the lane 110 defined by the first vehicle 140. In this example, the truck 142 is not within sufficient proximity of the first vehicle 140 for the truck's sensors 530, 540 to detect the first vehicle 140. Further, the truck's computing device determines that it is not compatible with the lane 110 defined by the first vehicle 140. For example, the truck's computing device determines that, based on the lane width of 10.25 feet and the truck's width of 8 feet, a buffer area for the truck would only be 1.125 feet. As discussed above, different size buffer areas may be employed based on different factors, however, the computing device determines that the minimum buffer area size for the truck 142 is two feet.

However, due to the lack of close proximity to the first vehicle 140, the truck's computing device determines that it may establish a suitable lane on the road 100. The truck's computing device determines a suitable buffer area of 3 feet, thus establishing a lane 14 feet wide. In addition, the truck's computing device determines that the lane should only extend for 200 feet to the front of the truck and travel with the truck 142. Finally, the truck's computing device establishes the lane 120 on the right side of the road, and centered seven feet from the right edge of the road as may be seen in FIG. 3. In some examples, as discussed above, the truck 142 may also transmit the defined lane to a lane management system.

As the truck 142 travels down the road, it begins to overtake the first vehicle 140. A proximity sensor affixed to the truck 142 detects the first vehicle 140 and transmits a message to the first vehicle 140 requesting its lane information. The first vehicle 140 responds to the request with lane information comprising the size and location of the lane 110. The truck again determines, as discussed above, that it is not compatible with the first vehicle's lane 110. Thus, the truck's autonomous driving functionality slows the truck to follow the first vehicle 140. However, the driver provides an instruction to the autonomous driving function to pass the truck 142, or the autonomous driving function determines to pass the truck 142 based on the road's speed limit and the speed of the vehicle 140.

To pass the vehicle 140, the truck's computing device 510 accesses sensor information from its sensors 530, 540 to determine whether any vehicles are operating in close proximity to the truck 142. For example, the truck's sensors 530, 540 may comprise one or more proximity sensors, as discussed above, which provide distances and directions to detected objects, such as other vehicles. In some examples, one of the sensors 530, 540 may comprise a directional or omnidirectional radar system, which may detect nearby vehicles and provide the information to computing device 510. Based on the received information, the computing device 510 determines whether the truck can safely change positions on the road to pass the vehicle 140. If not, the truck 142 maintains its position behind the vehicle 140 and the computing device 510 continues to monitor the truck's sensors 530, 540 until the truck 142 can safely pass the vehicle.

Figure 4:
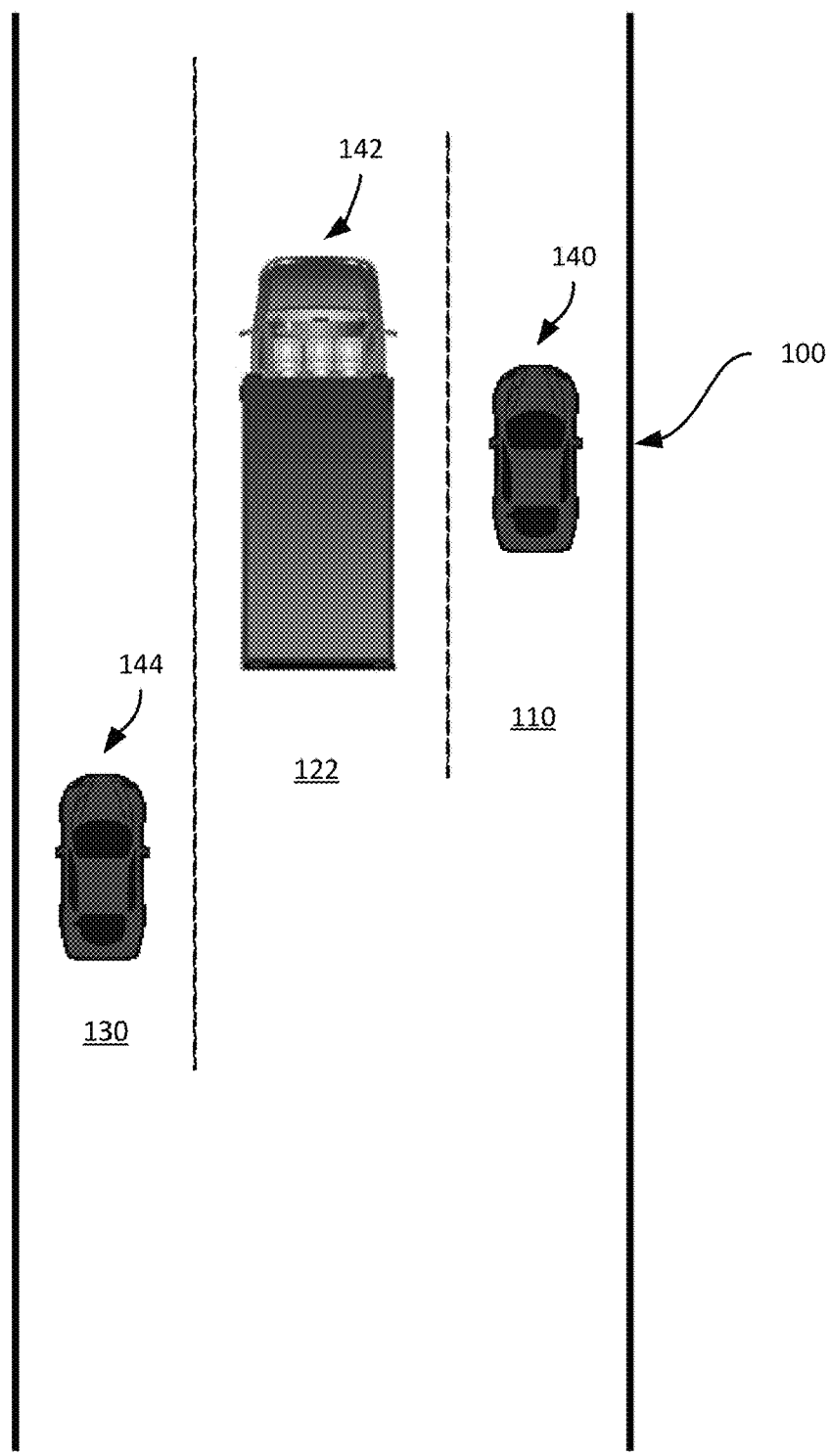

Once the computing device 510 determines that it can safely change positions on the road 100 and pass the vehicle 140, the computing device establishes a second lane on the road 100 that duplicates the truck's existing lane 120 but is positioned to the left of the truck's lane 120. In some examples, the second lane may be positioned to the left of and adjacent to the original lane 120, but without overlapping the original lane 120. However, in this example, the new second lane is established to be adjacent to the vehicle's lane 110, resulting in an overlap with the truck's original lane 120. Referring to FIG. 4, FIG. 4 shows that the truck is established in the new lane 122, which is defined adjacent to the vehicle's 140 lane 110. Such a configuration may be used to maximize road surface utilization and to avoid a re-definition of the second lane, or simply leaving a gap of unutilized road surface between the second lane and the vehicle's 140 lane 110, once the original lane 120 is eliminated. The truck's computing device 510 then transmits a message to vehicle 140, and other nearby vehicles, such as second vehicle 144 shown in FIG. 4, with the truck's new lane information. In some examples, the truck 142 may transmit the new lane information to a suitable lane management system. Such information may be used by the second vehicle 144, which is travelling at a high rate of speed in a lane 130 on the left edge of the road 100, to prevent the second vehicle 144 from inadvertently moving into the space occupied by the truck's lane 122 and colliding with the truck 142, which will be moving into the lane 122. Such an issue may arise because the second vehicle's sensors may not detect the presence of the truck 142, despite the truck's planned lane change.

The computing device 510 then provides the new lane information to the truck's autonomous driving functionality, which then changes into the new second lane. After the truck 142 has moved to the second lane 122, the computing device eliminates the original lane 120, and transmits a message to the nearby vehicles 140, 144 indicating that the original lane 120 has been released and the space on the road surface is available for use.

Figure 9A:
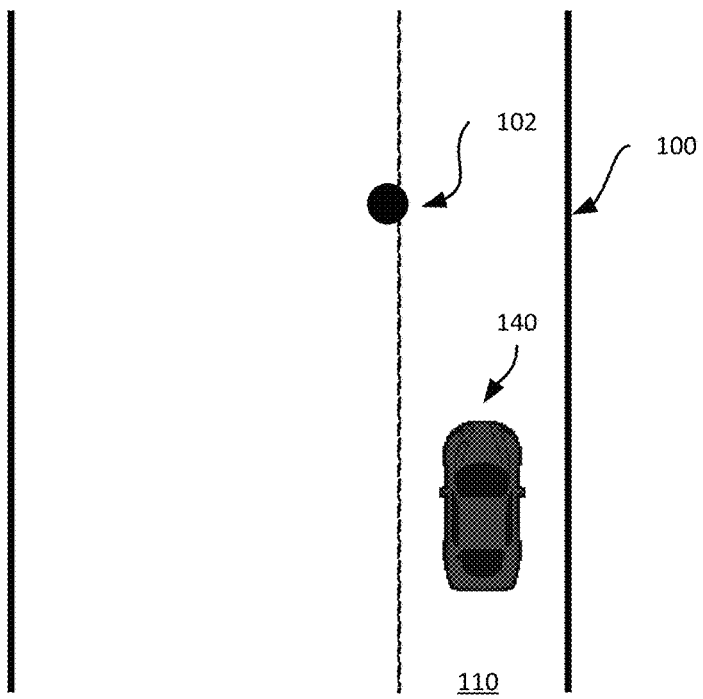
FIGS. 9A-12 show example dynamic lanes on a road.
Figure 9B:
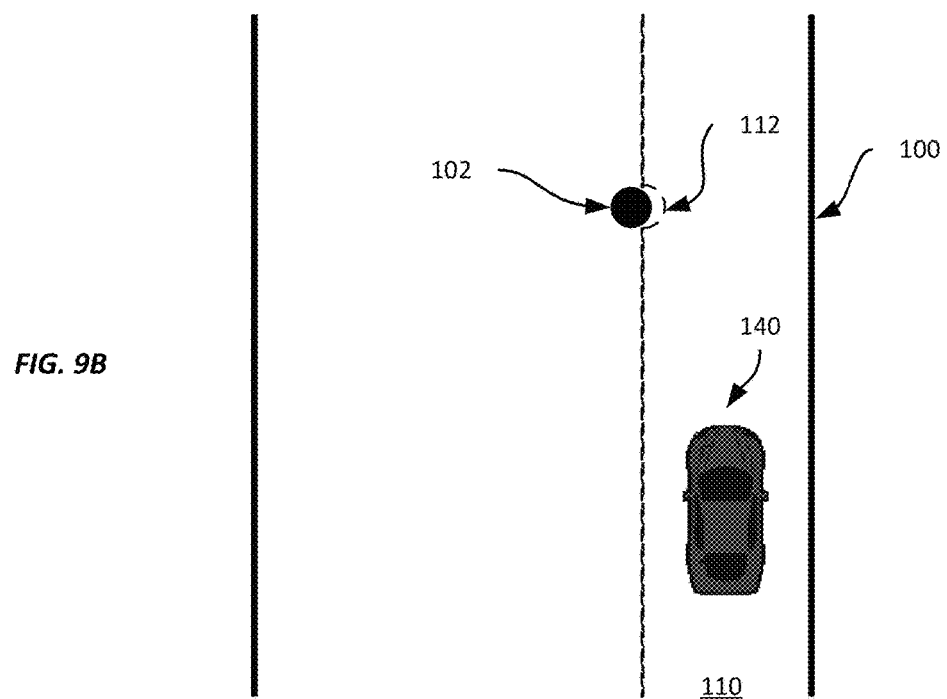

Referring now to FIG. 9A, FIG. 9A illustrates the road 100 having a pothole in the road surface. While discussed above with respect to a lane management system, in this discussion, the vehicle 140 has defined the lane 110 and determines based on accessed road information that the road surface has a pothole that partially overlaps with its lane 110. Thus, the vehicle's computing device 510 determines whether the shape of the lane can be adjusted to eliminate the overlap with the pothole 102. In this example, the road information indicates that lane 110 overlaps with the pothole 102 by 18 inches. Thus, vehicle's computing device 510 then calculates the maximum lane width at the location of the pothole to be 8.75 feet, which would temporarily result in a buffer area of 1.375 feet on each side of the vehicle 140. The vehicle's computing device 510 then determines a minimum buffer area threshold. In this example, the computing device 510 maintains multiple minimum buffer area thresholds, one for short distances (e.g., between 0 and 100 feet), one for intermediate distances (e.g., between 100 and 500 feet), and one for long distances (e.g., greater than 500 feet). Based on the size of the pothole, which in this example is approximately 3 feet in diameter, the computing device 510 determines that reducing the lane width to eliminate overlap with the pothole satisfies the short distance threshold, and so the computing device 510 defines the lane to have a shape that narrows to 8.75 feet at the pothole, and returns to the previously-determined width of 10.25 feet beyond the pothole. Referring to FIG. 9B, the redefined lane 110 with a lane pocket 112 is shown.

Referring now to FIG. 10, FIG. 10 shows an example road configuration having a plurality of lanes 1010-1030. In this example, traffic on the road 1000 is heavy and the road 1000 has a defined lane 1030 for use by semis 1044a-c and two lanes 1010, 1020 defined for passenger cars 1040a-b, 1042a-b. In this example, due to the proximity of the various vehicles, each vehicle either defined its own lane, which was merged into lanes of other vehicles travelling on the road 1000, or merged into a previously-defined lane from another vehicle. Thus, when traffic flow is sufficient, individual vehicles can merge their respective individual lanes to generate lanes that span significant distances.

As can be seen, the different lanes 1010-1030 have been defined to have different widths based on the different vehicles. In this example, as discussed above, entry and exit onto the road is accomplished on the right edge of the road. Further, the right and middle lanes 1010, 1020 are not sized to accommodate a truck. Thus, a truck travelling in the left lane 1030 attempting to exit the road 1000 will traverse lanes that are smaller than allowed. In this example, a truck seeking to exit the road 1000 could request assistance from a lane management system, such as described above, or could manage the process by itself, as will be discussed below.

In this example, truck 1044b determines that it needs to exit the road 1000, and determines that it needs to traverse lanes 1020 and 1010. The truck's computing device, such as computing device 510, then attempts to define a lane to allow the truck 1044b to exit the road. The computing device 510 receives the request and, in response, accesses vehicle and road information. In this example, it accesses information about the lanes 1010-1030 and transmits a request for vehicle information to the various vehicles travelling on the road in proximity to the truck 1044b. Based on the road and received vehicle information, as well as its own vehicle information, the computing device 510 establishes a portable lane 1032 suitable for the truck 1044b centered on the center of the truck, having a buffer area of 24 inches on either side of the truck, and that extends 60 feet in front of the truck and 20 feet behind the truck. The truck 1044b then transmits the information about the portable lane 1032 to the other vehicles in proximity to the truck 1044b, which may then adjust their positions within the other lanes 1010, 1020 to allow for movement of the portable lane into the other lanes 1010, 1020.

Referring now to FIG. 11, the truck 1044b has used the portable lane 1032 and has merged right and its portable lane, which is defined based on the center of the truck rather than the road surface, has moved with the truck as it moves into the middle lane 1020. As the truck 1044b moves into the middle lane 1020, proximity sensors on the vehicles 1042a, c detect its movement and adjust their speeds to allow for the truck 1044b to merge into the lane while staying out of the truck's portable lane 1032. The truck 1044b then moves into the right lane 1010 as shown in FIG. 12, and then exits the road 1000, and throughout the truck's movement, the portable lane remains centered on the truck 142 and so moves with the truck 142.

While a number of examples of a lane management system 780 defining at least one lane for the road based on the road information and the vehicle information have been discussed above, still other examples are within the scope of this disclosure.

At block 840, the computing device 510 provides the at least one lane to the vehicle. In this example, the computing device 510 provides the defined lane to the vehicle's autonomous driving functionality via the computing device's bus 650. In some examples, the computing device 510 provides the lane to a driver of the vehicle, such as by displaying it on the display 630, such as on a heads-up display.

Figure 8B:
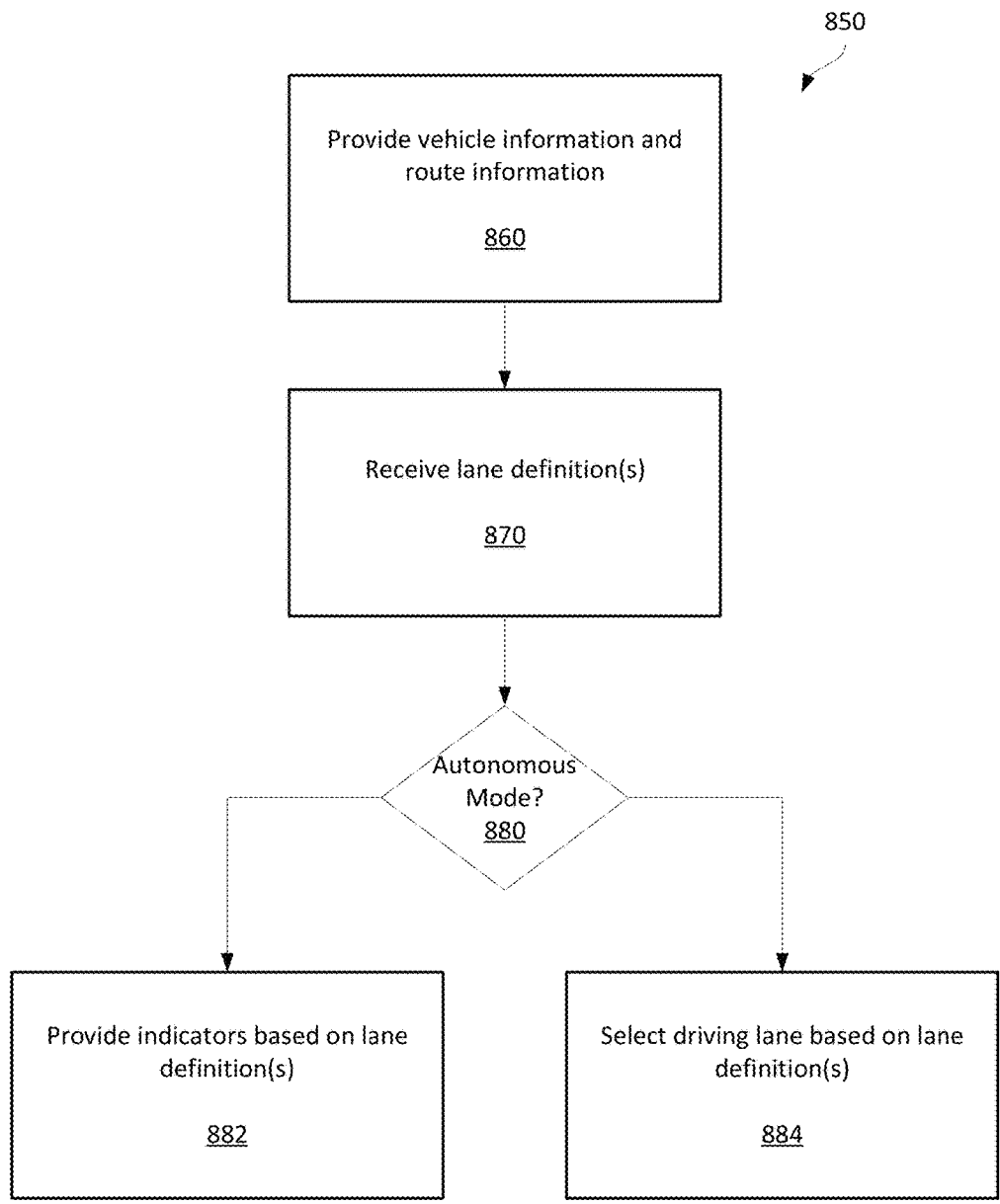

Referring now to FIG. 8B, FIG. 8B shows an example method 850 for dynamic lane definition. Reference will be made with reference to the computing device 510 of FIGS. 5 and 6 and the lane management system 780 of FIG. 7. However, any suitable computing device or lane management system according to this disclosure may be employed.

At block 860, the computing device 510 provides vehicle parameters and route information. In this example, the computing device 510 provides the vehicle information and route information to a lane management system 780, where it is received by a lane definition server 782. As discussed above, such vehicle information may include a year, make, and model of a vehicle, which may be used to access length, width, and height information for the vehicle. Other types of vehicle information are also discussed throughout this disclosure. In some examples, the computing device 510 may provide vehicle parameters and route information to one or more nearby vehicles, which may also be equipped with computing devices according to this disclosure.

In some examples, the computing device 510 may provide vehicle information and route information to other components of the vehicle, or other components of the vehicle may provide vehicle information and route information to the computing device 510. For example, a navigation system may provide route information to the computing device 510, while one or more sensors may provide information about vehicle speed, position on a road, proximity to other vehicles, etc. In some examples, the computing device 510 may provide the vehicle information or route information by accessing vehicle information or route information stored in memory 620.

At block 870, the computing device 510 receives one or more lane definitions. In this example, the computing device 510 receives one or more lane definitions from the lane management system 780. However, in some examples, the computing device 510 may generate one or more lane definitions, or may receive lane definitions from one or more nearby vehicles. As discussed above, a lane definition may include a lane position on a road surface, a lane width, a lane length, a lane duration, a direction of travel, etc. In some examples the computing device 510 may receive the lane definition from another hardware or software component within the vehicle.

At block 880, the computing device 510 determines whether the vehicle is operating in an autonomous mode or not. If the vehicle is operating in an autonomous mode, the method proceeds to block 884. Otherwise, it proceeds to block 882.

At block 882, the computing device 510 provides one or more indicators based on the received lane definition(s). In this example, the computing device 510 provides one or more display signals to a heads-up display device that projects lane markers onto a heads-up display visible to the driver, which allows the driver to see the lane. In some examples, the computing device 510 may provide one or more display signals to a VR headset or to a display screen within the vehicle, or the computing device 510 may activate external lights, such as one or more low-power lasers, on the vehicle that project lane markers onto a road surface such that the lane is made visible to the driver and potentially to nearby vehicles. The driver is then able to maneuver the car within the defined lane.

At block 884, the computing device 510 selects a driving lane based on the received lane definition(s). In this example, the computing device 510 selects a driving lane based on a width of the vehicle and a width of a defined lane. For example, as discussed above, a vehicle may require a minimum buffer on either side of the vehicle, e.g., 2 feet. Thus, the computing device 510 may select a lane that provides sufficient width to accommodate the width of the vehicle plus sufficient buffer space. In some examples, the computing device 510 may select a lane based on a speed of travel of the vehicle and the speed of travel of one or more vehicles in the defined lanes being within a threshold speed of each other, e.g., within 5 miles per hour.

Further, the vehicle may be restricted to certain lanes of travel based on vehicle information. For example, the vehicle's navigation system may have poor resolution from a location sensor, e.g., GNSS, which prevents sufficiently accurate position within a lane of travel. Such an issue may arise where, for example, the width of a lane is only two feet wider than the width of the vehicle, while the resolution of the GNSS sensor is approximately three feet. Thus, the computing device 510 may select a wider lane of travel to ensure it can remain within the lane.

While the description of the method 850 of FIG. 8B describes blocks 882 and 884 as mutually exclusive, in some examples, both blocks may be performed. For example, even when the vehicle is operating in an autonomous mode, the computing device 510 may provide indicators to one or more vehicle occupants based on the received lane definitions. Further, even if the vehicle is not operating in an autonomous mode, the computing device 510 may select a driving lane based on the lane definitions and provide an indication of that selection to, e.g., the driver of the vehicle.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises, or has access to, a computer-readable medium, such as a random access memory (RAM) coupled to the processor. The processor executes computer-executable program instructions stored in memory, such as executing one or more computer programs for dynamic lane definition, such as shown in FIGS. 8A-8B. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise, or have access to, processor-executable program code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method for dynamic lane definition, comprising:
   accessing, by a processor, vehicle information for a vehicle travelling on a road;
   accessing, by the processor, road information for the road; and
   dynamically defining, by the processor, at least one lane for the road based on the road information and the vehicle information, and
   providing the at least one lane to the vehicle;
   wherein dynamically defining the at least one lane comprises defining a position of the at least one lane on the road, and
   wherein dynamically defining the at least one lane comprises eliminating at least one previously defined lane for the road or adding at least one previously undefined lane for the road.

2. The method of claim 1, wherein dynamically defining the at least one lane further comprises defining one or more lane parameters, the one or more lane parameters comprising one or more of at least one of a characteristic of a vehicle permitted to travel on the at least one lane, a width of the at least one lane, an offset of the at least one lane from a given point along the road, a segment length of the at least one lane, a direction of travel of the at least one lane, a number of the at least one lane travelling in the direction of travel of the at least one lane, a duration of the at least one lane, a prohibition of use of the at least one lane, or a total number of lanes including the at least one lane, or any combination thereof.

3. The method of claim 1, wherein dynamically defining the at least one lane is further based on a time of day.

4. The method of claim 1, wherein dynamically defining the at least one lane comprises defining a lane pocket within a lane.

5. The method of claim 4, wherein defining the lane pocket is based on a pothole, debris, or obstruction in the road.

6. The method of claim 1, wherein dynamically defining the at least one lane comprises changing a direction of travel in the lane or prohibiting travel in the lane.

7. The method of claim 1, wherein the vehicle information comprises at least one of a make of the vehicle, a model of the vehicle, a length of the vehicle, a width of the vehicle, a speed of the vehicle, a heading of the vehicle, or a route or destination of the vehicle.

8. The method of claim 1, wherein the vehicle information comprises an operating mode of the vehicle.

9. The method of claim 1, further comprising:
   receiving a request for a lane on the road from the vehicle; and
   wherein dynamically defining the at least one lane is comprises:
      determining a size of the vehicle based on the vehicle information;
      determining a width of a first lane based on the size of the vehicle;
      determining a length of the first lane;
      determining a location for the first lane, and
      adding the first lane to the road; and
   further comprising:
      generating a lane assignment of the vehicle to the first lane; and
      providing the lane and the lane assignment to the vehicle in response to the request.

10. The method of claim 9, wherein dynamically defining the at least one lane further comprises determining the road has no defined lanes.

11. The method of claim 9, wherein the location of the first lane is centered on the vehicle, and wherein the first lane has a fixed length and travels with the vehicle.

12. The method of claim 11, wherein the location of the first lane is centered on the vehicle based on a position of a global navigation satellite system ("GNSS") receiver on the vehicle.

13. The method of claim 1, wherein dynamically defining the at least one lane comprises defining a idleness period for a first lane, and further comprising eliminating the first lane in response to determining the first lane has been idle for a time greater than the idleness period.

14. A system for dynamic lane definition, comprising:
   a non-transitory computer-readable medium; and
   a processor in communication with the non-transitory computer-readable medium, the processor configured to execute program code stored in the non-transitory computer-readable medium, the program code comprising program code configured to cause the processor to:
      access road information for a road;
      access vehicle information for a vehicle travelling on the road; and
      dynamically define at least one lane for the road based on the road information and the vehicle information, and
      provide the at least one lane to the vehicle;

wherein dynamically defining the at least one lane comprises defining a position of the at least one lane on the road, and wherein dynamically defining the at least one lane comprises eliminating at least one previously defined lane for the road or adding at least one previously undefined lane for the road.

15. The system of claim 14, wherein the program code is further configured to cause the processor to define the at least one lane for the road further based on a time of day.

16. The system of claim 14, wherein the program code is further configured to cause the processor to define a lane pocket within the at least one lane.

17. The system of claim 16, wherein the program code is further configured to cause the processor to define a lane pocket based on a pothole, debris, or obstruction in the road.

18. The system of claim 14, wherein the program code is further configured to cause the processor to change a direction of travel in the lane or prohibit travel in the lane.

19. The system of claim 14, wherein the vehicle information comprises at least one of a make of the vehicle, a model of the vehicle, a length of the vehicle, a width of the vehicle, a speed of the vehicle, a heading of the vehicle, or a route or destination of the vehicle.

20. The system of claim 14, wherein the vehicle information comprises an operating mode of the vehicle.

21. A non-transitory computer-readable medium comprising processor-executable program code, the program code configured to cause a processor to:
    access road information for a road;
    access vehicle information for a vehicle travelling on the road; and
    dynamically define at least one lane for the road based on the road information and the vehicle information, and
    provide the at least one lane to the vehicle;
    wherein dynamically defining the at least one lane comprises defining a position of the at least one lane on the road, and
    wherein dynamically defining the at least one lane comprises eliminating at least one previously defined lane for the road or adding at least one previously undefined lane for the road.

22. The non-transitory computer-readable medium of claim 21, wherein the program code is further configured to cause the processor to dynamically define the at least one lane for the road further based on a time of day.

23. The non-transitory computer-readable medium of claim 21, wherein the program code is further configured to cause the processor to change a direction of travel in the lane or prohibit travel in the lane.

24. The non-transitory computer-readable medium of claim 21, wherein the vehicle information comprises at least one of a make of the vehicle, a model of the vehicle, a length of the vehicle, a width of the vehicle, a speed of the vehicle, a heading of the vehicle, an operating mode of the vehicle, or a route or destination of the vehicle.

25. A system for dynamic lane definition, comprising:
    means for accessing road information for a road;
    means for accessing vehicle information for a vehicle travelling on the road; and
    means for dynamically defining at least one lane for the road based on the road information and the vehicle information, and
    means for providing the at least one lane to the vehicle;
    wherein dynamically defining the at least one lane comprises defining a position of the at least one lane on the road, and
    wherein dynamically defining the at least one lane comprises eliminating at least one previously defined lane for the road or adding at least one previously undefined lane for the road.

26. The system of claim 25, wherein the means for dynamically defining the lane comprises:
    means for determining a number of lanes for the road;
    means for defining a plurality of lanes for the road based on the number of lanes for the road, and
    means for defining widths for each of the defined plurality of lanes.

27. The system of claim 25, wherein the vehicle information comprises an operating mode of the vehicle.

28. The system of claim 25, wherein the means for dynamically defining the lane comprises defining a lane pocket within the at least one lane based on a pothole, debris, or obstruction in the road.

29. The system of claim 25, wherein the means for dynamically defining the lane comprises changing a direction of travel in the lane or prohibiting travel in the lane.

* * * * *